(12) United States Patent
Fujita et al.

(10) Patent No.: US 7,638,230 B2
(45) Date of Patent: Dec. 29, 2009

(54) LITHIUM ION SECONDARY BATTERY

(75) Inventors: Hideaki Fujita, Hannan (JP); Tsuyoshi Hatanaka, Naga-gun (JP); Tetsuya Hayashi, Kadoma (JP); Akira Nagasaki, Neyagawa (JP); Yusuke Fukumoto, Moriguchi (JP); Kohei Suzuki, Yao (JP)

(73) Assignee: Panasonic Corporation, Osaka (JP)

( * ) Notice: Subject to any disclaimer, the term of this patent is extended or adjusted under 35 U.S.C. 154(b) by 940 days.

(21) Appl. No.: 11/213,874

(22) Filed: Aug. 30, 2005

(65) Prior Publication Data

US 2006/0051663 A1 Mar. 9, 2006

(30) Foreign Application Priority Data

Sep. 3, 2004 (JP) ............................. 2004-257210
Sep. 24, 2004 (JP) ............................. 2004-276835

(51) Int. Cl.
*H01M 6/10* (2006.01)

(52) U.S. Cl. ....................................................... 429/94

(58) Field of Classification Search .................... 429/94
See application file for complete search history.

(56) References Cited

U.S. PATENT DOCUMENTS

| 6,391,488 | B1 | 5/2002 | Shimizu et al. |
| 6,805,994 | B1 | 10/2004 | Shibamoto |
| 2004/0166407 | A1 | 8/2004 | Nakajima et al. |

FOREIGN PATENT DOCUMENTS

| CN | 1280399 A | 1/2001 |
| JP | 07-220759 | 8/1995 |
| JP | 8-236093 A | 9/1996 |
| JP | 09-190814 | * 7/1997 |
| JP | 2001-167798 A | 6/2001 |
| JP | 2004-063343 | 2/2004 |
| KR | 10-2004-0075723 | 8/2004 |

OTHER PUBLICATIONS

Chinese Office Action issued in corresponding Chinese Patent Application No. CN 2005100978829, dated Jan. 12, 2007.

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

A lithium ion secondary battery including: an electrode group including a belt-like positive electrode and a belt-like negative electrode that are wound with a separator interposed therebetween; and a can with a bottom for accommodating the electrode group, wherein the positive electrode has a positive electrode current collector and a positive electrode mixture layer carried on the positive electrode current collector, the negative electrode has a negative electrode current collector and a negative electrode mixture layer carried on the negative electrode current collector, and a porous heat-resistant layer is partially provided between the separator and at least one of the positive electrode mixture layer and the negative electrode mixture layer. Since a porous heat-resistant layer is thus placed, a high performance lithium ion secondary battery capable of efficiently preventing internal short circuit due to overheating while preventing decrease in battery characteristics can be provided.

14 Claims, 5 Drawing Sheets

F I G. 3 a
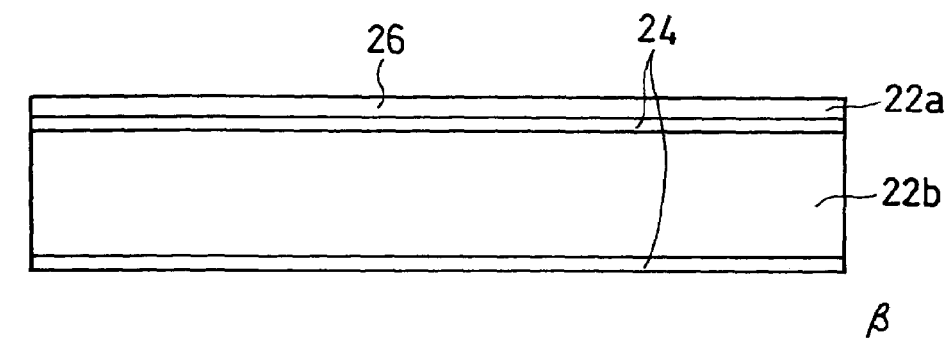
α  β
F I G. 3 b
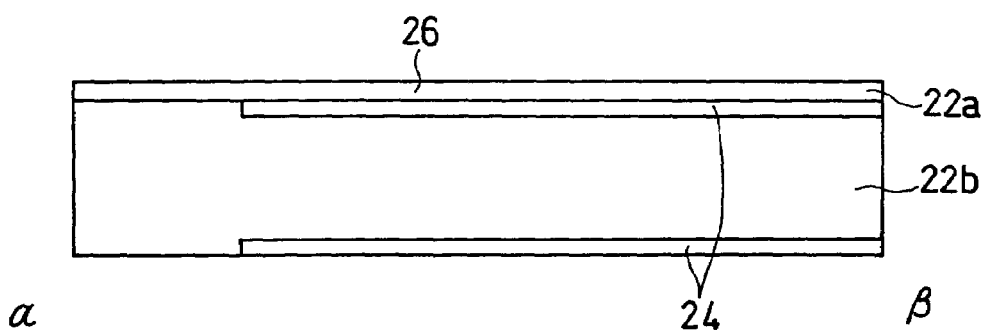
α  β

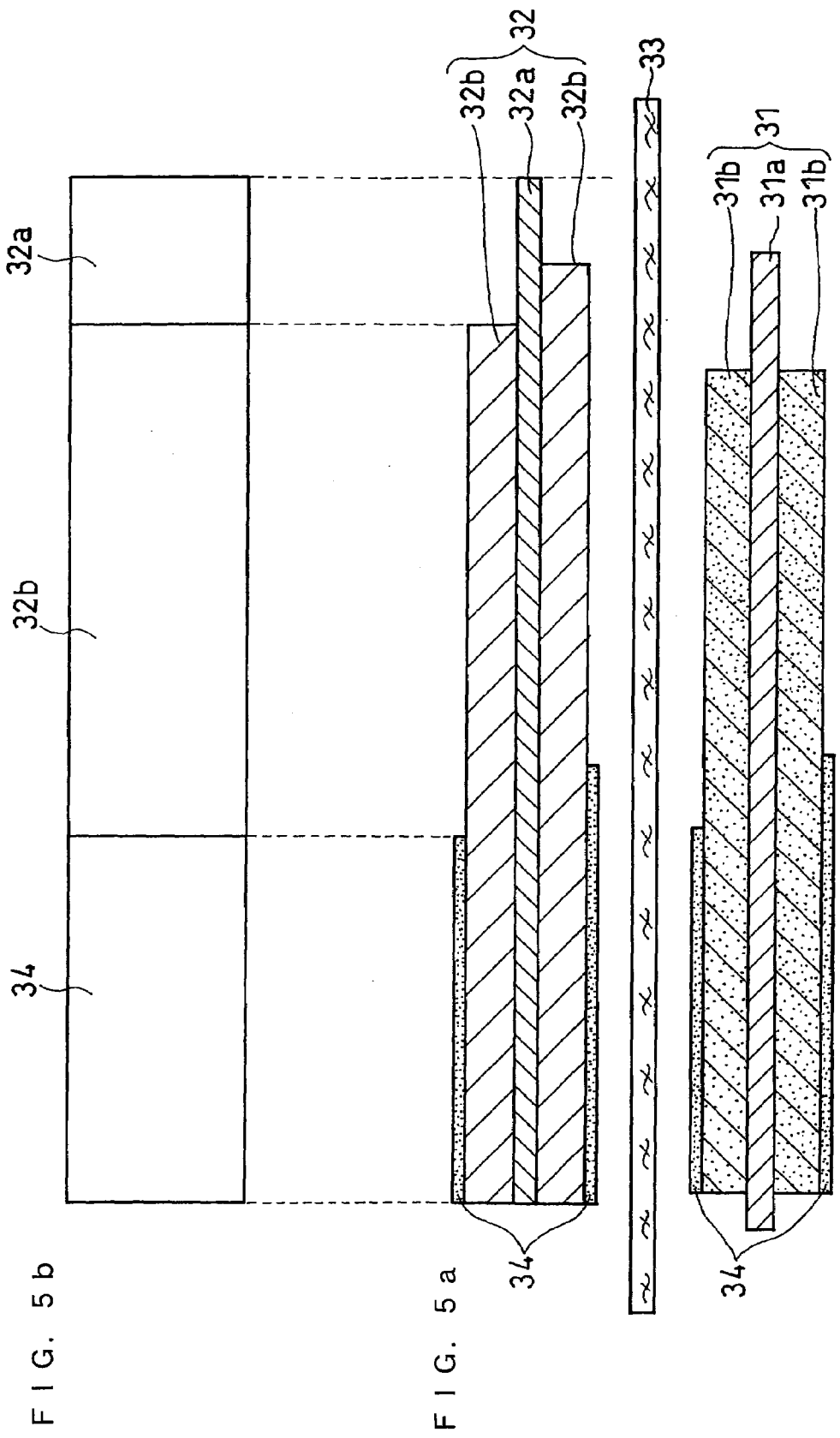

LITHIUM ION SECONDARY BATTERY

FIELD OF THE INVENTION

The present invention relates to a lithium ion secondary battery having high safety, more specifically, to a lithium ion secondary battery having battery characteristics efficiently maintained.

BACKGROUND OF THE INVENTION

A lithium ion secondary battery is a storage battery having high energy density and is therefore used as a main power source of various portable appliances. A chemical battery such as a lithium ion secondary battery includes, in general, a positive electrode, a negative electrode and a separator placed between the positive electrode and the negative electrode. This separator has a role of keeping an electrolyte while electrically insulating the positive electrode and the negative electrode.

Currently, in a lithium ion secondary battery, an electrode group having a positive electrode and a negative electrode that are wound with a separator interposed therebetween is mainly used. In general, a positive electrode used in such an electrode group has a positive electrode current collector such as an aluminum foil and the like and a positive electrode mixture layer including lithium composite oxide and the like carried thereon. Likewise, a negative electrode has a negative electrode current collector such as a copper foil and the like and a negative electrode mixture layer including graphite and the like carried thereon. As the separator, a microporous thin membrane sheet and the like composed of a resin such as polyethylene and the like are used.

When the above-mentioned sheet-shaped separator composed of a resin is melted or shrinks by overheating, internal short circuit is generated. In this case, because of short circuit reaction heat generated instantly, a separator further shrinks to enlarge a short circuit part, and further enormous reaction heat is generated. Thus, there is a problem of promotion of abnormal overheating.

Recently, for avoiding such a problem, there is a suggestion on formation of a porous heat-resistant layer on the surface of a positive electrode mixture layer and a negative electrode mixture layer (see, Japanese Laid-Open Patent Publication (JP-A) No. 7-220759). The porous heat-resistant layer is formed by applying a slurry containing fine particles and a binder on the surface of a mixture layer and drying the slurry.

The short circuit reaction is known to be most vigorous when a positive electrode current collector comes into contact with a negative electrode current collector and a negative electrode mixture layer. Therefore, there is a suggestion on formation of a porous heat-resistant layer only on a portion at which internal short circuit tends to occur. Specifically, there is a suggestion on formation of a porous heat-resistant layer composed of a powder and a binder resin, on an exposed part of a positive electrode current collector and a negative electrode current collector provided for welding of a lead current collector (see, JP-A No. 2004-63343). The above-mentioned powder has a heat-resistance of 500° C. or more.

By the technology described in JP-A No. 7-220759, it is possible to realize a lithium ion secondary battery excellent in short circuit-resistance. However, even if the above-mentioned porous heat-resistant layer has ion conductivity, its ion conductivity is small, and hence, the ion conductivity of an electrode plate lowers, to increase reaction resistance. Therefore, if such a porous heat-resistant layer is provided on the whole region in which an electrode reaction is performed, a charging and discharging reaction does not occur easily.

As described above, JP-A No. 2004-63343 describes formation of a porous heat-resistant layer only on a portion at which internal short circuit tends to occur due to overheating. However, currently, it has been known that the probability of occurrence of internal short circuit on a portion as described in JP-A No. 2004-63343 is not so high.

Then, an object of the present invention is to provide a lithium ion secondary battery capable of securing a battery reaction so as to maintain battery characteristics while efficiently preventing internal short circuit by overheating.

BRIEF SUMMARY OF THE INVENTION

The present invention relates to a lithium ion secondary battery comprising: an electrode group comprising a belt-like positive electrode and a belt-like negative electrode that are wound with a separator interposed therebetween; and a can with a bottom for accommodating the electrode group, wherein the positive electrode has a positive electrode current collector and a positive electrode mixture layer carried on the positive electrode current collector, the negative electrode has a negative electrode current collector and a negative electrode mixture layer carried on the negative electrode current collector, and a porous heat-resistant layer is partially provided between the separator and at least one of the positive electrode mixture layer and the negative electrode mixture layer.

It is preferable, in the above-mentioned lithium ion secondary battery, that the porous heat-resistant layer is positioned along at least one side of at least one of the positive electrode mixture layer and the negative electrode mixture layer.

It is preferable, in the above-mentioned lithium ion secondary battery, that an exposed part of the positive electrode current collector on which the positive electrode mixture layer is not carried is provided along at least one shorter side of the belt-like positive electrode and the porous heat-resistant layer is provided along the boundary between the positive electrode mixture layer and the exposed part of the positive electrode current collector.

It is preferable, in the above-mentioned lithium ion secondary battery, that an exposed part of the positive electrode current collector on which said positive electrode mixture layer is not carried is provided along at least one shorter side of said belt-like positive electrode and the porous heat-resistant layer is provided so as to face said boundary between the positive electrode mixture layer and the exposed part of the positive electrode current collector with said separator interposed therebetween.

It is preferable, in the above-mentioned lithium ion secondary battery, that the exposed part of the positive electrode current collector is provided along a shorter side of the positive electrode on the winding end side.

It is preferable, in the above-mentioned lithium ion secondary battery, that an exposed part of the positive electrode current collector on which the positive electrode mixture layer is not carried is provided along at least one longer side of the belt-like positive electrode and the porous heat-resistant layer is provided along at least one boundary between the positive electrode mixture layer and the exposed part of the positive electrode current collector.

It is preferable, in the above-mentioned lithium ion secondary battery, that an exposed part of the positive electrode current collector on which the positive electrode mixture layer is not carried is provided along at least one longer side of the belt-like positive electrode and the porous heat-resistant layer is provided so as to face at least one boundary between the positive electrode mixture layer and the exposed part of the positive electrode current collector with said separator interposed therebetween.

It is preferable, in the above-mentioned lithium ion secondary battery, that an exposed part of the negative electrode current collector on which the negative electrode mixture layer is not carried is provided along at least one longer side of the belt-like negative electrode and the porous heat-resistant layer is provided along at least one boundary between the negative electrode mixture layer and the exposed part of the negative electrode current collector.

It is preferable, in the above-mentioned lithium ion secondary battery, that an exposed part of the negative electrode current collector on which the negative electrode mixture layer is not carried is provided along at least one longer side of the belt-like negative electrode and the porous heat-resistant layer is provided so as to face at least one boundary between the negative electrode mixture layer and the exposed part of the negative electrode current collector with said separator interposed therebetween.

It is preferable, in the above-mentioned lithium ion secondary battery, that the exposed part of the positive electrode current collector and the exposed part of the negative electrode current collector are respectively provided at two end faces of the electrode group, a positive electrode current collecting terminal is welded to the exposed part of the positive electrode current collector, and a negative electrode current collecting terminal is welded to the exposed part of the negative electrode current collector.

It is preferable, in the above-mentioned lithium ion secondary battery, that the porous heat-resistant layer is provided from an edge of winding initiation side to a given position on at least one of the positive electrode mixture layer and the negative electrode mixture layer. Here, it is preferable that, when the area of the porous heat-resistant layer is represented by A and the area of the mixture layer is represented by B, the ratio of the area A to the area B (the ratio A/B) is 0.02 to 0.3. As used herein, the area of the mixture layer refers to the area of the whole plane of the mixture layer in contact with the porous heat-resistant layer.

It is preferable, in the above-mentioned lithium ion secondary battery, that the porous heat-resistant layer is provided on the negative electrode mixture layer.

It is preferable, in the above-mentioned lithium ion secondary battery, that when the area of the porous heat-resistant layer is represented by A and the area of the negative electrode mixture layer is represented by B1, the ratio A/B1 of the area A to the area B1 is 0.02 to 0.3.

It is preferable, in the above-mentioned lithium ion secondary battery, that the width of the negative electrode mixture layer is larger than the width of the positive electrode mixture layer.

It is preferable, in the above-mentioned lithium ion secondary battery, that the thickness of the porous heat-resistance layer is 1 to 10 μm.

It is preferable, in the above-mentioned lithium ion secondary battery, that the porous heat-resistance layer comprises an insulating filler and a binder.

It is preferable, in the above-mentioned lithium ion secondary battery, that the insulating filler comprises at least one selected from the group consisting of alumina, magnesia, titania, zirconia and silica.

It is preferable, in the above-mentioned lithium ion secondary battery, that the binder comprises at least one of a modified rubber particle containing an acrylonitrile unit, and polyvinylidene fluoride.

It is preferable, in the above-mentioned lithium ion secondary battery, that the porous heat-resistant layer comprises the binder in an amount of 1 to 5 parts by weight per 100 parts by weight of the insulating filler.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3a is a first side view showing schematically a negative electrode used in a lithium ion secondary battery according to still another embodiment of the present invention.

FIG. 3b is a second side view showing schematically the negative electrode of FIG. 3a.

FIG. 5a is a sectional view showing schematically a positive electrode, negative electrode and separator used in an electrode group of a lithium ion secondary battery according to still another embodiment of the present invention.

FIG. 5b is a side view of the negative electrode as shown in FIG. 5a.

DETAILED DESCRIPTION OF THE INVENTION

The present invention will be illustrated below referring to drawings.

The lithium ion secondary battery of the present invention comprises: an electrode group comprising a belt-like positive electrode and a belt-like negative electrode that are wound with a separator interposed therebetween; and a can with a bottom for accommodating the electrode group. The positive electrode includes a positive electrode current collector and a positive electrode mixture layer carried on the positive electrode current collector, and the negative electrode includes a negative electrode current collector and a negative electrode mixture layer carried on the negative electrode current collector. And, a porous heat-resistant layer is partially provided between the separator and at least one of the positive electrode mixture layer and the negative electrode mixture layer. At this time, the porous heat-resistant layer may be positioned along at least one side of at least one of the positive electrode mixture layer and the negative electrode mixture layer, for example. By this constitution, it becomes possible to suppress generation of internal short circuit due to overheating without lowering battery characteristics.

Preferable embodiments of the present invention will be shown below. In the present invention, a porous heat-resistant layer is efficiently provided on a portion at which internal short circuit tends to occur by overheating, as shown below.

Embodiment 1

Figure 1:
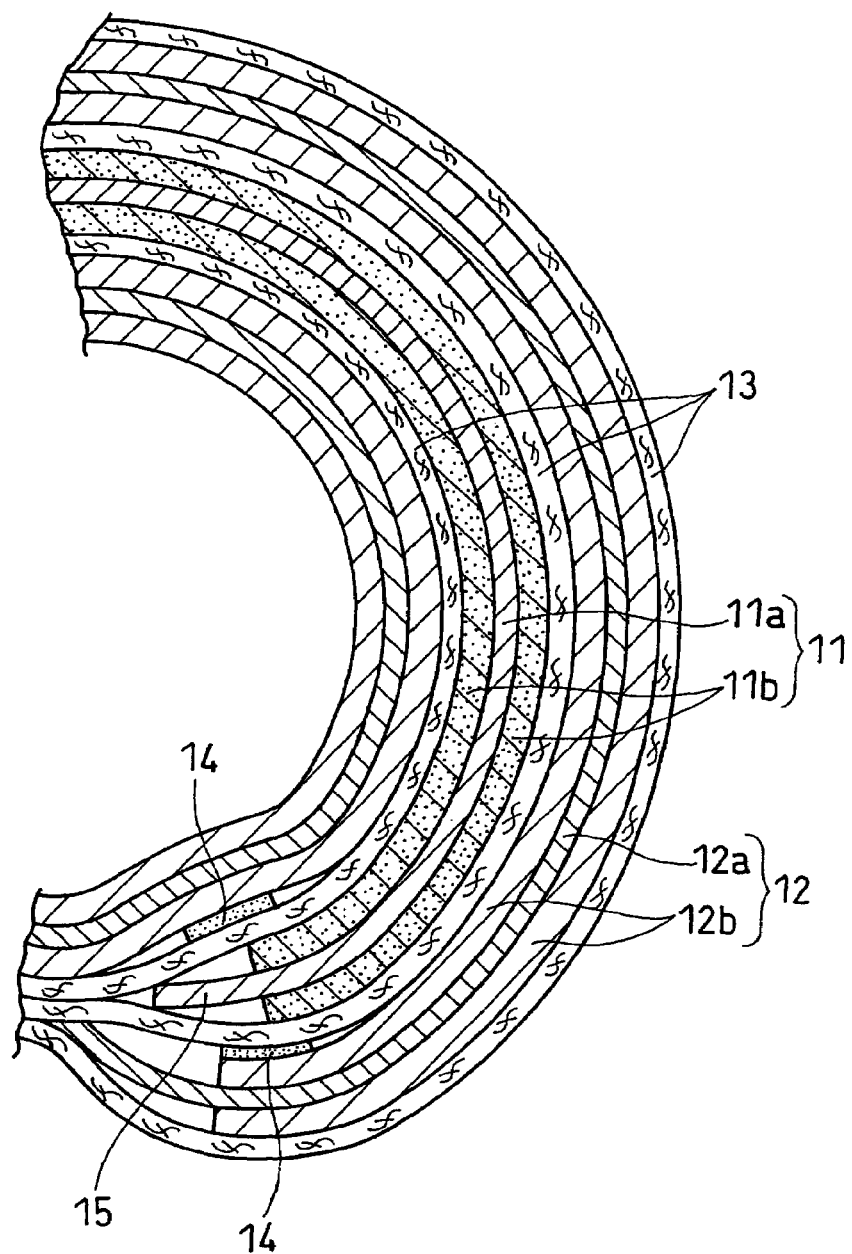
FIG. 1 is a cross-sectional view showing schematically an electrode group used in a lithium ion secondary battery according to an embodiment of the present invention.

FIG. 1 shows a part of the winding end side of an electrode group used in a lithium ion secondary battery according to one embodiment of the present invention.

The electrode group of FIG. 1 includes a belt-like positive electrode 11, a belt-like negative electrode 12, and a separator 13 provided between the positive electrode and the negative electrode. In the electrode group of FIG. 1, the positive electrode 11 includes a positive electrode current collector 11a and positive electrode mixture layers 11b carried on both surfaces thereof. The negative electrode 12 includes a negative electrode current collector 12a and negative electrode mixture layers 12b carried on both surfaces thereof. The positive electrode 11 and the negative electrode 12 are wound with the separator 13 interposed therebetween. Further, an exposed part 15 of the positive electrode current collector on which the positive electrode mixture layer is not carried is provided along a shorter side of the positive electrode on the winding end side.

Figure 2:
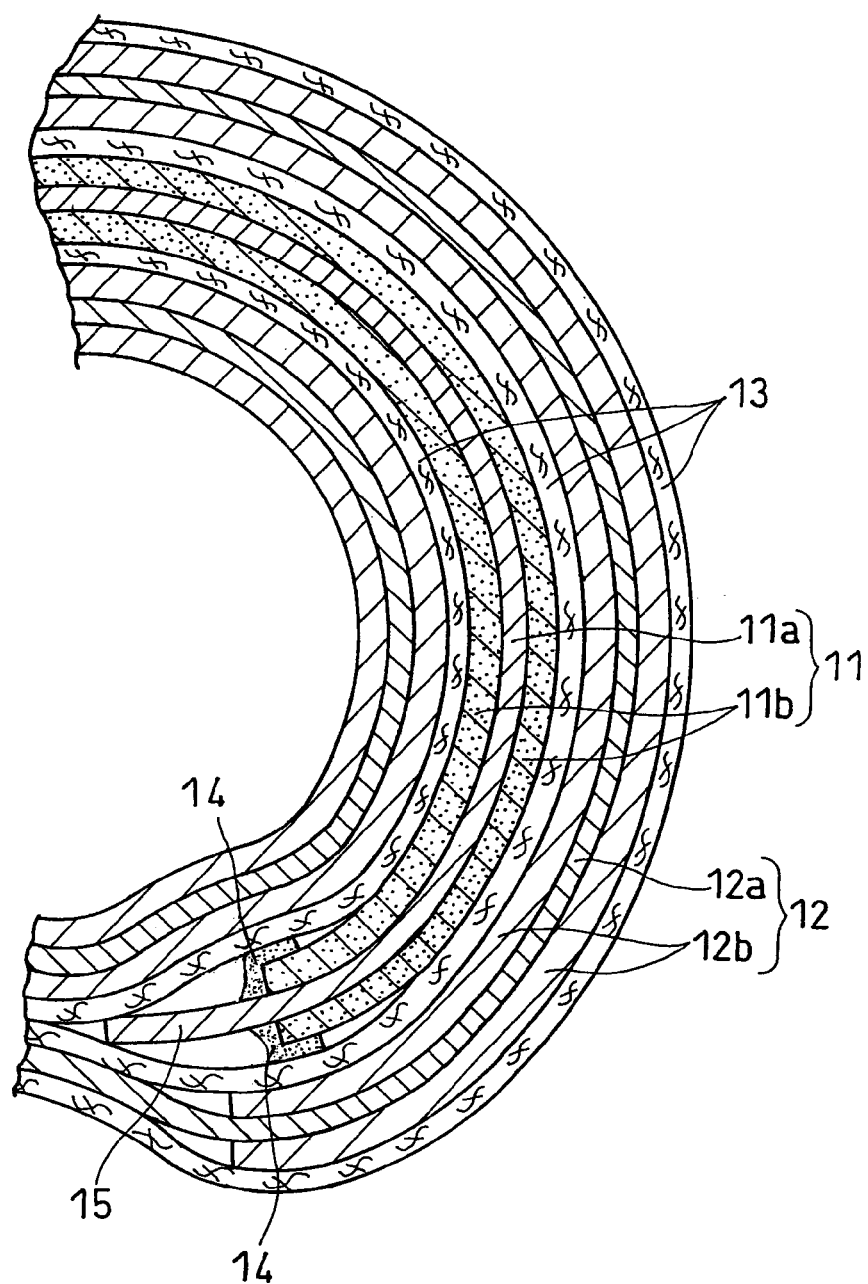
FIG. 2 is a cross-sectional view showing schematically an electrode group used in a lithium ion secondary battery according to another embodiment of the present invention.

In the electrode group of FIG. 1, a porous heat-resistant layer 14 is provided on the negative electrode mixture layer, so as to face the boundary between the positive electrode mixture layer and the exposed part of the positive electrode current collector with the separator 13 interposed therebetween. Also, FIG. 2 shows a porous heat-resistant layer 14 that is formed along the boundary between the positive electrode mixture layer and the exposed part of the positive electrode current collector. In FIG. 2, the same constituent elements as those in FIG. 1 have the same numbers.

In batteries for a household application, in general, an exposed part of the current collector on which the positive electrode mixture layer is not carried is provided along at least one shorter side of the positive electrode as described above. In this case, at the boundary between the positive electrode mixture layer and the exposed part of the positive electrode current collector and at the peripheral regions thereof, short circuit due to overheating tends to occur. The reason for this is as described below. That is, as the positive electrode current collector, an aluminum foil, for example, is used. Since this aluminum foil is soft, it is difficult in some cases to cut the foil so as to block generation of a barb-shaped projection (hereinafter, referred to as cut burr). Consequently, unbalance in cutting occurs between the exposed part of the current collector and the positive electrode mixture layer capable of being cut without generating cut burr, and cut burr of the positive electrode current collector tends to occur at the boundary between the positive electrode current collector and the positive electrode mixture layer.

Further, the positive electrode can be manufactured by forming mixture layers on both surfaces of a current collector to obtain a positive electrode plate and cutting this positive electrode plate along the length direction. In such a case, since the positive electrode mixture layer is cut over long distance before cutting the exposed part of the current collector, the above-mentioned unbalance becomes more remarkable and cut burr occurs further easily.

Therefore, when the positive electrode current collector is made of a soft substance such as an aluminum foil, cut burr occurs further easily. When this cut burr pierces through the separator to contact the facing negative electrode mixture layer, internal short circuit tends to occur.

In such case, it is preferable to provide the porous heat-resistant layer along the boundary between the positive electrode mixture layer and the exposed part of the positive electrode current collector, or to provide the porous heat-resistant layer on the negative electrode, particularly, on the negative electrode mixture layer, so as to face the above-mentioned boundary with the separator interposed therebetween, as shown in FIG. 1. Thus, by providing the porous heat-resistant layer at a portion at which cut burr tends to occur, even if the cut burr pierces through the separator 13, this cut burr does not reach the negative electrode mixture layer, so that internal short circuit due to overheating can be avoided. Further, for example, even if the separator is melted, contact of the positive electrode current collector (cut burr) and the negative electrode mixture layer can be prevented by the porous heat-resistant layer.

Further, even if the porous heat-resistant layer is provided along the above-mentioned boundary or so as to face the above-mentioned boundary with the separator interposed therebetween, lowering of battery characteristics can be suppressed. The reason for this is that since a current collecting terminal is provided at the exposed part of the positive electrode current collector, electron conductivity increases at peripheral regions thereof, and even if the porous heat-resistant layer is present, giving and receiving electrons are effected actively and lowering of ion conductivity can be suppressed.

As described above, according to the present invention, internal short circuit due to overheating can be efficiently prevented without lowering battery characteristics. Resultantly, reliability of a lithium ion secondary battery can be significantly improved.

It is further preferable that the porous heat-resistant layer is placed on the negative electrode mixture layer so as to face the above-mentioned boundary with the separator interposed therebetween. The reason for this is that, in general, the negative electrode mixture layer has higher porosity than the positive electrode mixture layer, and therefore, even if the porous heat-resistant layer is provided on the negative electrode mixture layer, balance in ion conductivity is kept excellent.

When the porous heat-resistant layer is provided on the negative electrode mixture layer, it is preferable that when the area of the porous heat-resistant layer is represented by A and the area of the negative electrode mixture layer is represented by B1, the ratio A/B1 of the area A of the porous heat-resistant layer to the area B1 of the negative electrode mixture layer is 0.02 to 0.3. When the ratio A/B1 is greater than 0.3, transfer of ions is disturbed by the porous heat-resistant layer, battery characteristics lower in some cases. When the ratio A/B1 is smaller than 0.02, internal short circuit-resistance lowers in some cases. Therefore, by setting the ratio A/B1 at 0.02 to 0.3, balance of battery characteristics and internal short circuit-resistance can be kept excellent.

In each negative electrode mixture layer with the porous heat-resistant layer provided, it is preferable that the ratio A/B1 is in the above-mentioned range.

When the porous heat-resistant layer is provided on the negative electrode mixture layer, it is preferable that the length along the width direction of the negative electrode mixture layer is larger than that of the positive electrode mixture layer. The reason for this is that, in a lithium ion secondary battery, the positive electrode is a capacity limiting electrode, and hence, by setting the length along the width direction of the negative electrode mixture layer larger than the length along the width direction of the positive electrode mixture layer, loss of battery capacity can be avoided.

The porous heat-resistant layer may also be provided on the positive electrode along the boundary between the positive electrode mixture layer and the exposed part of the positive electrode current collector. Also in this case, even if cut burr occurs, reaching of this cut burr to the negative electrode mixture layer can be prevented, as described above.

The above-mentioned exposed part of the positive electrode current collector may be provided along a shorter side at winding initiation side of the positive electrode, or, as shown in FIG. 1, along a shorter side at winding end side of the positive electrode.

The thickness of the porous heat-resistant layer is preferably from 1 to 10 μm. When the thickness of the porous heat-resistant layer is smaller than 1 μm, an effect of suppressing internal short circuit lowers in some cases. When the thickness of the porous heat-resistant layer is greater than 10 μm, reaction resistance increases and battery characteristics lower though slightly, in some cases. Therefore, by controlling the thickness of the porous heat-resistant layer in a range from 1 to 10 μm, generation of internal short circuit can be suppressed by the porous heat-resistant layer, and simultaneously, balance of battery characteristics and internal short circuit-resistance can be kept excellent.

As the porous heat-resistant layer 14, it is possible to use resins of high heat-resistance, for example, those in the form of filter paper made by molding an aramid or polyamideimide having a melt temperature of 250° C. or more, those composed of an insulating filler and a binder, and the like.

A porous heat-resistant layer composed of a resin of high heat-resistance in the form of filter paper is placed, for example, between a positive electrode and a negative electrode. A porous heat-resistant layer composed of an insulating filler and binder is placed, for example, on a positive electrode mixture layer and/or negative electrode mixture layer.

Of porous heat-resistant layers as described above, a porous heat-resistant layer composed of an insulating filler and a binder is preferable. The reason for this is that an insulating filler is used as a main material, and the particles of the insulating filler are mutually bonded by a binder, so that structural strength increases.

As the insulating filler used in the porous heat-resistant layer, it is preferable to use at least one selected from the group consisting of alumina, magnesia, titania, zirconia and silica. The reason for this is that these inorganic oxides such as alumina, magnesia, titania, zirconia and silica have high heat conductivity, and are stable electrochemically. Resin beads of high heat-resistance which are not melted or burnt at 1000° C. or lower may be used as the insulating filler.

In general, a binder absorbs an electrolyte to swell after constituting a battery, and therefore, the addition amount thereof is more preferably small. Accordingly, as the binder used in the porous heat-resistant layer, those showing a binding effect even with small amount are preferable.

It is preferable to use, as such a binder, at least one of polyvinylidene fluoride (hereinafter, abbreviated as PVDF) and modified rubber containing an acrylonitrile unit.

Examples of the modified rubber containing an acrylonitrile unit include those in the form of particle (for example, BM-500B manufactured by Nippon Xeon Co. Ltd. having a core-shell structure), those soluble in a solvent used in manufacturing a porous heat-resistant layer (for example, BM-720H manufactured by Nippon Xeon Co. Ltd. including an acrylonitrile unit and a $CH_2$ unit), and the like.

For example, when PVDF is used as a binder, it is preferable to allow a paste as a precursor to have suitable viscosity. By using such a paste, it is possible to form a uniform porous heat-resistant layer.

The modified rubber containing an acrylonitrile unit in the form of particle (for example, BM-500B) is used preferably in combination with a binder having thickening characteristics, specifically, PVDF or carboxymethylcellulose (hereinafter, abbreviated as CMC), polyethylene oxide (hereinafter, abbreviated as PEO), other modified rubber containing an acrylonitrile unit (for example, BM-720H) and the like.

The amount of a binder contained in the porous heat-resistant layer is preferably from 1 to 5 parts by weight per 100 parts by weight of an insulating filler. Since the binder absorbs an electrolyte to swell after constitution of a battery as described above, when the amount of the binder is greater than 5 parts by weight, the vacancy in the porous heat-resistant layer becomes smaller and ion conductivity lowers in some cases. When the amount of the binder is smaller than 1 part by weight, the mechanical strength of the porous heat-resistant layer lowers in some cases. Resultantly, by controlling the amount of the binder in the above-mentioned range, the mechanical strength of the porous heat-resistant layer can be increased while allowing the porous heat-resistant layer to have suitable ion conductivity.

As the positive electrode active material contained in a positive electrode mixture layer, for example, lithium composite oxides can be used. Examples of the lithium composite oxide include those represented by the composition formula $LiMO_2$ or $LiM_2O_4$. Here, the element M is at least one of transition metal elements such as Co, Mn, Ni and Fe. Further, those obtained by substituting a part of the above-mentioned transition metal elements by a typical element such as Al, Mg and the like may be used as the positive electrode active material.

As the positive electrode current collector, those composed of materials stable under positive electrode potential can be used without particular restriction. As such a positive electrode current collector, for example, those composed of an aluminum foil are used.

As the negative electrode active material contained in the negative electrode mixture layer, for example, materials capable of absorbing or intercalating/desorbing or deintercalating lithium can be used. Examples thereof include graphite, silicide, titanium alloy materials and the like. These may be used singly or in combination of two or more.

As the negative electrode current collector, those composed of materials stable under negative electrode potential can be used without particular restriction. As such a negative electrode current collector, for example, those composed of a copper foil are used.

As the separator, those composed of a microporous film which has high ability to retain an electrolyte and stable under both positive electrode potential and negative electrode potential are used. As such a separator, for example, those composed of polypropylene (hereinafter, abbreviated as PP), those composed of polyethylene, those composed of polyimide, those composed of polyamide, and the like are mentioned.

Embodiment 2

Figure 4:
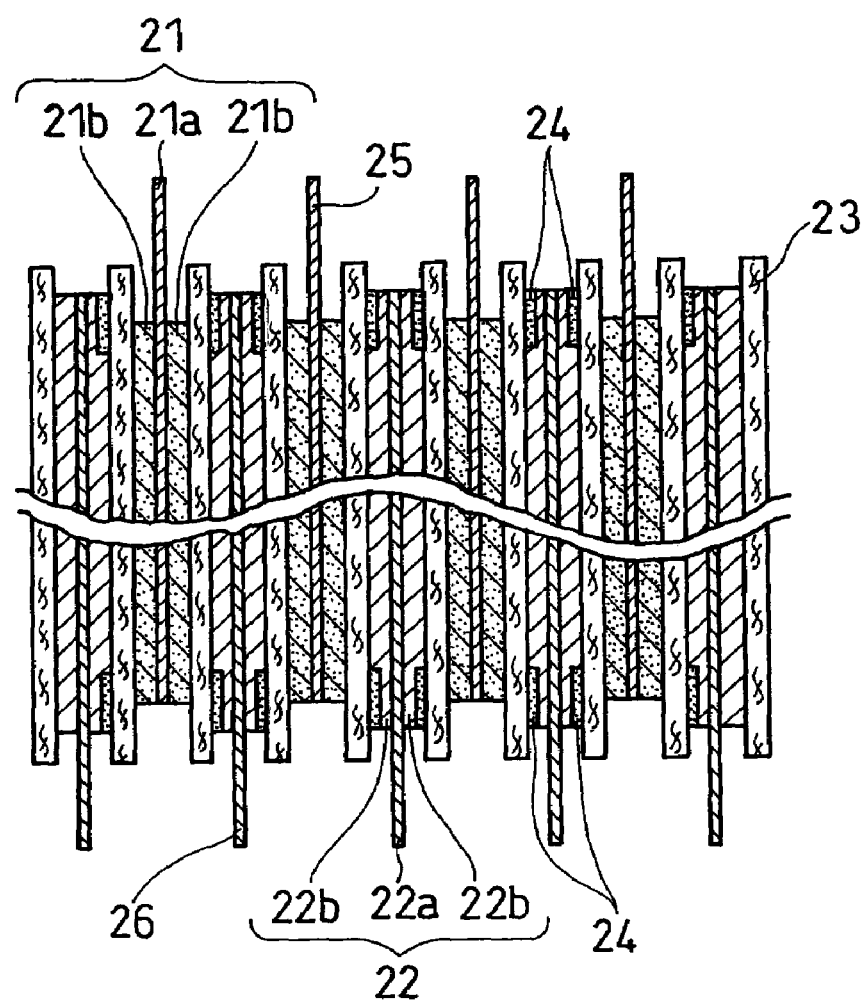
FIG. 4 is a longitudinal sectional view showing schematically an electrode group formed using the negative electrode as shown in FIG. 3a and FIG. 3b.

FIGS. 3a and 3b show a first side view and a second side view of a negative electrode used in a lithium ion secondary battery according to another embodiment of the present invention, and FIG. 4 shows a longitudinal sectional view of an electrode group manufactured using the negative electrode shown in FIGS. 3a and 3b. Also in this embodiment, the porous heat-resistant layer and the like are the same as those used in Embodiment 1.

In this embodiment, a belt-like positive electrode 21 includes a positive electrode current collector 21a and positive electrode mixture layers 21b carried on both surfaces thereof. A belt-like negative electrode 22 includes a negative electrode current collector 22a and negative electrode mixture layers 22b carried on both surfaces thereof. Here, an exposed part 25 of the positive electrode current collector on which the positive electrode mixture layer is not carried is provided along one of the two longer sides of the positive electrode. Likewise, as shown in FIGS. 3a and 3b, an exposed part 26 of the negative electrode current collector on which the negative electrode mixture layer is not carried is provided along one of the two longer sides of the negative electrode. To the exposed part 25 of the positive electrode current collector, a positive electrode current collecting terminal is welded, and to the exposed part 26 of the negative electrode current collector, a negative electrode current collecting terminal is welded.

By winding such a positive electrode 21 and a negative electrode 22 with a separator 23 interposed therebetween, an electrode group as shown in FIG. 4 is constituted.

Here, regarding the negative electrode, the first side of the negative electrode 22 shown in FIG. 3a faces the inner side of the electrode group and the second side of the negative electrode 22 shown in FIG. 3b faces the outer side of the electrode group, and the negative electrode 22 is wound so that the β side end is a winding initiation side and the α side end is a winding end side. The length along the width direction of the negative electrode mixture layer is larger than the length along the width direction of the positive electrode mixture layer.

In batteries for high output applications and the like, an exposed part of the positive electrode current collector on which the positive electrode mixture layer is not carried is formed in the form of belt along at least one longer side of the positive electrode, and an exposed part of the negative electrode current collector on which the negative electrode mixture layer is not carried is formed in the form of belt along at least one longer side of the negative electrode, as described above. In this case, short circuit due to overheating tends to occur at at least one boundary between the positive electrode mixture layer and the exposed part of the positive electrode current collector and at least one boundary between the negative electrode mixture layer and the exposed part of the negative electrode current collector. The reason for this is probably as follows. That is, when welding conditions for an exposed part of a current collector and a current collecting terminal are deficient, heat in welding transfers to the separator, so that the separator becomes melted. When the extent of this heat transfer is large, melting of the separator reaches an edge of the mixture layer over the exposed part of the current collector in some cases. In such a case, the positive electrode mixture layer and the negative electrode mixture layer may come into contact in a wide range to cause large scale internal short circuit.

Then, it is preferable to provide a porous heat-resistant layer 24 along the boundary between the exposed part of the negative electrode current collector and the negative electrode mixture layers provided on both surfaces of the negative electrode current collector, or so as to face the boundary with the separator interposed therebetween. Likewise, it is preferable to provide a porous heat-resistant layer 24 along the boundary between the positive electrode current collector and the positive electrode mixture layers provided on both surfaces of the positive electrode current collector, or so as to face the boundary with the separator interposed therebetween. FIGS. 3a and 3b show a case of providing a porous heat-resistant layer 24 along the boundary between the exposed part of the negative electrode current collector and the negative electrode mixture layers provided on both surfaces of the negative electrode current collector.

Since the porous heat-resistant layer is thus provided, even if heat in welding the current collecting terminal to the exposed part of the current collector transfers to cause melting or shrinkage of the separator, direct contact of the positive electrode mixture layer and the negative electrode mixture layer can be prevented. That is, internal short circuit due to overheating can be avoided.

Also in this embodiment, battery characteristics scarcely lower even if a porous heat-resistant layer is provided at a given position on the mixture layer. This is based on the same reason for the above-mentioned embodiment 1.

In this embodiment, the porous heat-resistant layer may be provided on either the positive electrode or negative electrode, or on both positive electrode and negative electrode.

In the case of providing the exposed part of the current collector along respective two longer sides of the positive electrode and/or negative electrode, it is preferable to provide a porous heat-resistant layer along each boundary between the mixture layer and the exposed part of the current collector or at a position facing each boundary with the separator interposed therebetween.

When the exposed part of the current collector is provided only along one longer side and the exposed part of the current collector is not provided at another longer side, on each positive electrode surface and/or each negative electrode surface, it may also be permissible to provide a porous heat-resistant layer along a longer side of the mixture layer on which the exposed part of the current collector is not provided. For example, in the negative electrode of FIGS. 3a and 3b, the porous heat-resistant layer 24 is provided along the boundary between the mixture layer and the exposed part of the current collector and a longer side of the mixture layer on which the exposed part is not provided.

For example, when the negative electrode is present on the outermost part of the wound electrode group, the porous heat-resistant layer 24 may be provided at a part not facing the positive electrode with the separator interposed therebetween at the second side of the negative electrode, alternatively, the porous heat-resistant layer 24 may not be provided as shown in FIG. 3b or 4.

When a porous heat-resistant layer is provided on the negative electrode mixture layer, the ratio A/B1 is preferably 0.02 to 0.3 like the above-mentioned embodiment 1.

In this embodiment, as shown in FIG. 4, it is preferable that the exposed part of the positive electrode current collector is provided at one end face of the electrode group, and the exposed part of the negative electrode current collector is provided at another end face. By this, it is possible to provide a positive electrode current collecting terminal and a negative electrode current collecting terminal without mutual contact thereof.

In this embodiment, an electrode can be manufactured, for example, as described below. First, a mixture layer is provided so that an exposed part of a current collector is formed along a side parallel to the length direction of a belt-like current collector, to obtain an electrode plate. Next, the electrode plate is cut in parallel to the width direction of the belt-like current collector, to produce an electrode of given size. In this case, an influence by cut burr can be ignored, differing from the case of the above-mentioned embodiment 1, since cutting distance is short, namely, the distance over which stress is applied is short.

Embodiment 3

FIG. 5a shows a cross sectional view of a positive electrode, a separator and a negative electrode used in a lithium ion secondary battery according to another embodiment of the present invention. Also in this embodiment, as the porous heat-resistant layer and the like, the same materials as in the above-mentioned embodiment 1 are used.

As shown in FIG. 5a, a positive electrode 31 includes a positive electrode current collector 31a and positive electrode mixture layers 32b carried on both surfaces thereof. A negative electrode 32 includes a negative electrode current collector 32a and negative electrode mixture layers 32b carried on both surfaces thereof. Further, on each mixture layer of the positive electrode 31 and the negative electrode 32, a porous heat-resistant layer 34 is provided from an edge of winding initiation side to a given position. As an example, a schematic view of a surface opposite to a surface in contact with a separator of a negative electrode is shown in FIG. 5b.

Irrespective of application and constitution, short circuit due to overheating tends to occur around a core part of an electrode group constituted by winding a positive electrode and a negative electrode with a separator interposed therebetween. The reason for this is as described below. Namely, the positive electrode and the negative electrode are manufactured using a material of high electric conductivity. Further, also in its production equipment, a material of high electric conductivity is used. Flakes of these materials (hereinafter, also referred to as conductive extraneous material) remain in an electrode group while adhering on the positive electrode, negative electrode or separator in mistake in some cases. The conductive extraneous material in general has a diameter of about several μm, and internal short circuit does not occur easily if the distance between the positive electrode and the negative electrode is secured at the same value as the initial thickness (10 to 30 μm) of the separator. However, parts near the core part of an electrode group, namely, the positive electrode winding initiation side and the negative electrode winding initiation side are affected most easily by an influence of significant swelling and shrinkage due to charging and discharging. As a result, the separator becomes thinner, and the initial thickness cannot be maintained in some cases. Under this condition, when a conductive extraneous material is present near the core part of an electrode group even if its diameter is only about several μm, the conductive extraneous material pierces through the separator around this position, so that the positive electrode mixture layer and negative electrode mixture layer come into contact to cause internal short circuit. By this short circuit, heat is generated, the separator is melted, and short circuit is further spread.

In this embodiment, a porous heat-resistant layer is provided from an edge of winding initiation side of each mixture layer to a given position. Here, when the area of the porous heat-resistant layer is represented by A and the area of the mixture layer is represented by B, the ratio of the area A to the area B (the ratio A/B) is preferably from 0.02 to 0.3. The reason for this is as described above.

By thus providing a porous heat-resistant layer from an edge of winding initiation side of an electrode to a given position, even if the thickness of a separator decreases by various stresses, short circuit between a positive electrode and a negative electrode by a conductive extraneous material can be prevented. Further, instead of the separator having decreased thickness and which cannot retain an electrolyte easily, a porous heat-resistant layer retains an electrolyte and securing ion conductivity becomes possible. Therefore, even if a porous heat-resistant layer is provided on a mixture layer, decrease in battery characteristics can be suppressed.

In this embodiment, a porous heat-resistant layer may be provided either on a positive electrode or a negative electrode, or may be provided on both of a positive electrode and a negative electrode. Further, in this embodiment, it is preferable that the length along the width direction of a negative electrode mixture layer is larger than the length along the width direction of a positive electrode mixture layer.

In the above-mentioned embodiment 2 and embodiment 3, as the porous heat-resistant layer, the same material as in the embodiment 1 can be used. Also, the thickness of a porous heat-resistant layer, the amount of a binder contained in a porous heat-resistant layer, and the like are the same as in the case of the embodiment 1.

Methods of manufacturing a positive electrode, a negative electrode and a porous heat-resistant layer will be illustrated below.

The positive electrode can be manufactured, for example, as described below.

A positive electrode active material as described above is kneaded with a conductive agent, a binder, a dispersing medium and the like, to prepare a positive electrode paste. The resultant positive electrode paste is applied on a positive electrode current collector so that an exposed part is present on a given position of the positive electrode current collector, and dried to obtain a positive electrode plate having a positive electrode mixture layer formed on the positive electrode current collector. The resultant positive electrode plate can be rolled to a given thickness and cut into a given size, to obtain a positive electrode. Here, as the above-mentioned conductive agent, carbon black such as acetylene black (hereinafter, abbreviated as AB) and the like, graphite materials and metal fine powders stable under positive electrode potential can be used. As the binder, materials stable under positive electrode potential, for example, PVDF, modified rubbers containing acrylonitrile unit, polytetrafluoroethylene, and the like can be used. Further, for stabilizing a positive electrode paste, a cellulose derivative such as CMC and the like may be added as a thickening agent to the positive electrode paste.

The negative electrode can be manufactured, for example, as described below.

A negative electrode active material as described above is kneaded with a binder, dispersing medium and the like, to prepare a negative electrode paste. The resultant negative electrode paste is applied on a negative electrode current collector so that an exposed part is present on a given position of the negative electrode current collector, and dried to obtain a negative electrode plate having a negative electrode mixture layer formed on the negative electrode current collector. The resultant negative electrode plate can be rolled to a given thickness and cut into a given size, to obtain a negative electrode. Here, as the binder, materials stable under negative electrode potential, for example, PVDF, styrene-butadiene rubber copolymer (hereinafter, abbreviated as SBR) and the like can be used. Further, for stabilizing a negative electrode paste, a cellulose derivative such as CMC and the like may be added as a thickening agent to the negative electrode paste.

The porous heat-resistant layer containing an insulating filler and a binder can be manufactured, for example, as described below.

An insulating filler, binder, dispersing medium and the like are stirred using a double arm kneader and the like to obtain a paste. The resultant paste is applied on a part as shown in the above-mentioned embodiments 1 to 3 by a means such as a doctor blade, die coater and the like, and the applied paste is dried by far infrared radiation, hot air and the like. Thus, a porous heat-resistant layer can be formed.

EXAMPLE

The present invention will be illustrated based on examples below.

Example 1

(Battery 1-1)

(Manufacturing of Positive Electrode)

100 parts by weight of lithium cobaltate, 4 parts by weight of PVDF, 3 parts by weight of AB and a suitable amount of N-methyl-2-pyrrolidone (hereinafter abbreviated as NMP) were mixed by a double arm kneader, to prepare a positive electrode paste. The resultant positive electrode paste was applied on both surfaces of a positive electrode current collector (thickness: 15 μm) made of an aluminum foil, dried and rolled, to obtain a positive electrode plate including a current collector and mixture layers carried on both surfaces thereof. In this operation, the positive electrode paste was applied on the positive electrode current collector so that an exposed part of the positive electrode current collector was present at the winding end side of the positive electrode obtained by cutting. Rolling was conducted so that the total thickness of the positive electrode plate was 160 μm.

Next, the resultant positive electrode plate was cut into a width of 53 mm and a total length of 580 mm, to obtain a positive electrode. Here, the length of the mixture layer formed on both surfaces of the current collector was controlled to 550 mm on each of two surfaces, so that an exposed part of the current collector existed at an edge of the winding end side of the positive electrode. When the positive electrode was cut, the interval of two cutting blades was controlled to 200 μm so that cut burr having a height of 50 to 100 μm was generated at the cut portion of the exposed part of the positive electrode current collector.

(Manufacturing of Negative Electrode)

100 parts by weight of artificial graphite, 1 part by weight of SBR, 1 part by weight of CMC and suitable amount of water were mixed by a double arm kneader, to prepare a negative electrode paste. The resultant negative electrode paste was applied on both surfaces of a current collector (thickness: 10 μm) made of a copper foil, dried and rolled, to obtain a negative electrode plate including a current collector and mixture layers carried on both surfaces thereof. Rolling was conducted so that the total thickness of the negative electrode plate was 180 μm.

Next, the resultant negative electrode plate was cut into a width of 55 mm and a total length of 650 mm, to obtain a negative electrode. Here, the length of the mixture layer formed on both surfaces of the current collector was controlled to 620 mm on each of two surfaces, so that an exposed part of the current collector existed at an edge of the winding end side of the negative electrode.

(Formation of Porous Heat-resistant Layer)

As shown in FIG. 1, a porous heat-resistant layer was formed on a negative electrode mixture layer, so as to face the boundary between a positive electrode mixture layer provided at the winding end side of a positive electrode and an exposed part of a positive electrode current collector with a separator interposed therebetween, when an electrode group was constituted. The porous heat-resistant layer was formed as described below.

3 parts by weight of PVDF was added per 100 parts by weight of alumina particles having an average particle size of 0.5 μm, and further, a suitable amount of NMP was added, to obtain a mixture. The mixture was stirred by a double arm kneader, and the alumina particles and PVDF were bead-mill-dispersed using zirconia beads having a diameter of 0.2 mm, to obtain a paste. The resultant paste was applied at a length of 10 mm on the negative electrode mixture layer so as to face the above-mentioned boundary with a separator interposed therebetween when an electrode group was constituted, and dried to obtain a porous heat-resistant layer. Here, the thickness of the porous heat-resistant layer was 5 μm. The width of the porous heat-resistant layer was the same as the width of the negative electrode mixture layer.

(Fabrication of Battery)

The positive electrode and negative electrode obtained as described above were wound with a separator (thickness: 23 μm) made of a PP microporous film interposed therebetween, to obtain an electrode group.

Next, the resultant electrode group was inserted into a cylindrical metal can having a bottom with a diameter of 18 mm and a height of 65 mm, and an electrolyte was added to this. Here, the electrolyte was obtained by dissolving $LiPF_6$ at a concentration of 1 mol/liter in a solvent mixture in which ethylene carbonate (EC), diethyl carbonate (DEC), and dimethyl carbonate (DMC) are mixed in the ratio of 20:40:40 (ratio by weight).

Next, an opening of the metal can was sealed with a sealing plate, to manufacture a lithium ion secondary battery. The nominal capacity of the resultant battery was 2 Ah. Thus manufactured battery was called battery 1-1.

(Batteries 1-2 to 1-5)

Lithium ion secondary batteries were manufactured in the same manner as for the battery 1-1 except that the thickness of the porous heat-resistant layer was 0.8 μm, 1 μm, 10 μm or 12 μm. The resultant batteries were called batteries 1-2 to 1-5.

(Batteries 1-6 to 1-10)

Lithium ion secondary batteries were manufactured in the same manner as for the battery 1-1 except that fillers composed of magnesia, titania, zirconia, silica or aramid having the same diameter as the alumina particles were used instead of the alumina particles in manufacturing the porous heat-resistant layer. The resultant batteries were called respectively Examples 1-6 to 1-10.

(Battery 1-11)

A lithium ion secondary battery was manufactured in the same manner as for the battery 1-1 except that a modified rubber mixture containing an acrylonitrile unit (mixture of BM-500B and BM-720H manufactured by Nippon Xeon Co. Ltd. (mixing ratio (weight ratio), 1:1) (hereinafter, referred to also as modified rubber mixture) of the same weight as PVDF was used instead of PVDF. The resultant battery was called battery 1-11.

(Batteries 1-12 to 1-15)

Lithium ion secondary batteries were manufactured in the same manner as for the battery 1-1 except that the amount of PVDF per 100 parts by weight of the alumina particles was 0.8 parts by weight, 1 part by weigh, 5 parts by weight or 7 parts by weight in manufacturing the porous heat-resistant layer. The resultant batteries were called respectively 1-12 to 1-15.

Examples 1-16 to 1-19

Lithium ion secondary batteries were manufactured in the same manner as for the battery 1-1 except that the length of the porous heat-resistant layer was 12.4 mm, 49.6 mm, 186 mm or 248 mm. The resultant batteries were called respectively batteries 1-16 to 1-19.

(Reference Battery 1-1)

A lithium ion secondary battery was manufactured in the same manner as for the battery 1-1 except that the porous heat-resistant layer was formed on the whole surface of the negative electrode mixture layer. The resultant battery was called reference battery 1-1.

(Comparative Battery 1-1)

A lithium ion secondary battery was manufactured in the same manner as for the battery 1-1 except that the porous heat-resistant layer was not formed. The resultant battery was called comparative battery 1-1.

(Comparative Battery 1-2)

A lithium ion secondary battery was manufactured in the same manner as for the battery 1-1 except that the porous heat-resistant layer was formed only at an exposed part of the positive electrode current collector. The resultant battery was called comparative battery 1-2.

(Comparative Battery 1-3)

A lithium ion secondary battery was manufactured in the same manner as for the battery 1-1 except that the porous heat-resistant layer was formed only at an exposed part of the negative electrode current collector. The resultant battery was called comparative battery 1-3.

(Comparative Battery 1-4)

A lithium ion secondary battery was manufactured in the same manner as for the battery 1-1 except that a PP resin tape (thickness: 25 μm) was used instead of the porous heat-resistant layer and this PP resin tape was provided along the boundary between the positive electrode mixture layer and the exposed part of the positive electrode current collector. The resultant battery was called comparative battery 1-4.

Each of the resultant batteries was evaluated as described below.

(Short Circuit Examination)

20 of each battery were charged at a current value of 400 mA until the battery voltage reached 4.1V, and then, preserved for 7 days under an environment of 45° C. Batteries of which open circuit voltage decreased by 300 mV or more during preservation were called a short circuit battery. The proportions of short circuit batteries are designated as percentage in Tables 1 to 5.

(Capacity Confirmation)

One of the batteries, of each kind, showing no abnormality in the above-mentioned short circuit examination was discharged at a current value of 400 mA until the battery voltage decreased to 3.0 V.

Next, the battery after discharging was charged at a constant current value of 2 A until the battery voltage reached 4.2 V, and then, charged at a constant voltage of 4.2 V until the charging current decreased to 50 mA. Next, the battery after charging was discharged at a constant current value of 400 mA until the battery voltage decreased to 3.0 V. Such a charging and discharging cycle was repeated twice. The discharge capacities at the second cycle (discharge capacity) are shown in Tables 1 to 5.

(High-rate Characteristic Evaluation)

The batteries after the above-mentioned capacity confirmation were charged and discharged as described below.

Each battery was charged at a constant current value of 2 A until the battery voltage reached 4.2 V, and then, charged at a constant voltage value of 4.2 V until the charging current decreased to 50 mA. Next, the battery after charging was discharged at a constant current value of 4 A until the battery voltage decreased to 3.0 V, and the high-rate discharge capacity was measured. The proportion of the high-rate discharge capacity to the discharge capacity measured in the above-mentioned capacity confirmation is designated by percentage (high-rate discharge capacity ratio) in Tables 1 to 5.

(Abnormal Temperature Rising Test)

Each battery after the above-mentioned high-rate characteristic evaluation was charged at a current value of 400 mA until the battery voltage reached 4.25 V, and then, left for 6 hours under an environment of 120° C. In this procedure, when the temperature of the outer surface of the battery exceeded 130° C., the battery was judged to be overheated. Presence or absence of overheating of each battery are shown in Table 1 to 3 and 5.

(Cycle Life Characteristics)

Regarding the batteries 1-16 to 1-19, the capacity maintenance rate was measured.

Each battery was charged at a constant current value of 2 A under an environment of 45° C. until the battery voltage reached 4.2 V, and then, charged at a constant voltage value of 4.2 V until the charging current decreased to 50 mA. Next, the battery after charging was discharged at a constant current value of 2 A until the voltage decreased to 3.0 V. Such a charge and discharge cycle was repeated 500 times. The proportion of the discharge capacity at 500th cycle to the discharge capacity in the above-mentioned capacity confirmation is designated as percentage (capacity maintenance rate) in Table 4.

In Tables 2 and 3, data of the battery 1-1 are also shown. Table 4 shows the ratio A/B1 simultaneously.

TABLE 1

|  | thickness of porous heat-resistant layer (μm) | Proportion of short circuit batteries (%) | discharge capacity (mAh) | high-rate discharge capacity ratio (%) | presence or absence of overheating |
|---|---|---|---|---|---|
| battery 1-1 | 5 | 5 | 1989 | 89 | absence |
| battery 1-2 | 0.8 | 60 | 1991 | 90 | presence |
| battery 1-3 | 1 | 5 | 1990 | 89 | absence |
| battery 1-4 | 10 | 5 | 1990 | 88 | absence |
| battery 1-5 | 12 | 0 | 1988 | 84 | absence |

TABLE 2

|  | kind of filler | Proportion of short circuit batteries (%) | discharge capacity (mAh) | high-rate discharge capacity ratio (%) | presence or absence of overheating |
|---|---|---|---|---|---|
| battery 1-1 | alumina | 5 | 1989 | 89 | absence |
| battery 1-6 | magnesia | 5 | 1992 | 88 | absence |
| battery 1-7 | titania | 5 | 1980 | 86 | absence |
| battery 1-8 | zirconia | 5 | 1988 | 89 | absence |
| battery 1-9 | silica | 5 | 1985 | 90 | absence |
| battery 1-10 | aramid | 5 | 1991 | 88 | absence |

TABLE 3

| | kind of binder | amount of binder (parts by weight) | proportion of short circuit batteries (%) | discharge capacity (mAh) | high-rate discharge capacity ratio (%) | presence or absence of overheating |
|---|---|---|---|---|---|---|
| battery 1-1 | PVDF | 3 | 5 | 1989 | 89 | absence |
| battery 1-11 | modified rubber mixture | 3 | 0 | 1992 | 91 | absence |
| battery 1-12 | PVDF | 0.8 | 40 | 1992 | 93 | presence |
| battery 1-13 | PVDF | 1 | 5 | 1990 | 92 | absence |
| battery 1-14 | PVDF | 5 | 5 | 1987 | 88 | absence |
| battery 1-15 | PVDF | 7 | 0 | 1990 | 82 | absence |

TABLE 4

| | length of porous heat-resistant layer (mm) | ratio A/B1 | proportion of short circuit batteries (%) | discharge capacity (mAh) | high-rate discharge capacity ratio (%) | capacity maintenance rate (%) |
|---|---|---|---|---|---|---|
| battery 1-16 | 12.4 | 0.02 | 5 | 1984 | 89 | 83 |
| battery 1-17 | 49.6 | 0.08 | 5 | 1990 | 88 | 84 |
| battery 1-18 | 186 | 0.30 | 0 | 1988 | 89 | 84 |
| battery 1-19 | 248 | 0.40 | 0 | 1992 | 85 | 85 |

TABLE 5

| | proportion of short circuit batteries (%) | discharge capacity (mAh) | high-rate discharge capacity ratio (%) | presence or absence of overheating |
|---|---|---|---|---|
| Reference battery 1-1 | 5 | 1981 | 83 | Absence |
| Comparative battery 1-1 | 95 | 1995 | 90 | presence |
| Comparative battery 1-2 | 80 | 1997 | 91 | presence |
| Comparative battery 1-3 | 85 | 1992 | 89 | presence |
| Comparative battery 1-4 | 5 | 1958 | 87 | presence |

Approximately all of the comparative batteries 1-1 on which a porous heat-resistant layer was not formed caused short circuit under an influence of cut burr intentionally formed. The comparative battery 1-2 having the porous heat-resistant layer provided on the exposed part of the positive electrode current collector and the comparative battery 1-3 having the porous heat-resistant layer provided on the exposed part of the negative electrode current collector showed smaller short circuit as compared with the comparative battery 1-1, and manifested almost no effect of preventing short circuit. The reason for this is that in the comparative battery 1-2 and the comparative battery 1-3, a porous heat-resistant layer is not provided at a suitable position facing a place for easy generation of cut burr.

In the batteries 1-1 to 1-19 having the porous heat-resistant layer provided on the negative electrode mixture layer so as to face the boundary between the positive electrode mixture layer and the exposed part of the positive electrode current collector, the proportion of short circuit batteries was low. The reason for this is probably that reaching of cut burr to the negative electrode mixture layer can be reduced by the porous heat-resistant layer.

In the batteries 1-6 to 1-9 using magnesia, titania, zirconia or silica as the insulating filler instead of alumina, the proportion of short circuit batteries was small, and the heat-resistance was sufficient though slightly differing in capacity. Also in the battery 1-10 using aramid as the insulating filler, the proportion of short circuit batteries was small.

The battery capacity of the comparative battery 1-4 using a resin tape instead of the porous heat-resistant layer decreased significantly from the nominal capacity (2 Ah) as compared with other batteries. The reason for this is probably that the ion conduction of the part covered with the resin tape of the positive electrode mixture layer becomes impossible, and the battery capacity decreases by a quantity corresponding to its area.

In the reference battery 1-1 in which the porous heat-resistant layer is provided on the whole surface of the negative electrode mixture layer, the high-rate characteristics decreased as compared with the batteries 1-1 to 1-19. The reason for this is probably that since the porous heat-resistant layer is provided on the whole surface of the negative electrode mixture layer, reaction resistance increased remarkably.

In the battery 1-2 in which the thickness of the porous heat-resistant layer was 0.8 μm, the proportion of short circuit batteries was relatively high, and overheating in abnormal temperature rising was also observed. The reason for this is probably that the thickness of the porous heat-resistant layer was small, and further, a lot of fine pin holes were observed on the porous heat-resistant layer, so that short circuit sites increased and generation of internal short circuit could not be sufficiently suppressed. As a result, when the thickness of the porous heat-resistant layer is small, sufficient heat-resistance cannot be obtained in some cases.

On the other hand, in the battery 1-5 having the porous heat-resistant layer with a thickness of 12 μm, the high-rate discharge characteristics decreased slightly. The reason for this is probably that the thickness of the formed porous heat-resistant layer was large and the reaction resistance increased. Therefore, it is desirable that the thickness of the porous heat-resistant layer is 1 to 10 μm.

In the battery 1-11 using a modified rubber mixture as the binder instead of PVDF, the heat-resistance was sufficient. Further, deterioration of battery characteristics due to swelling of the above-mentioned modified rubber was not observed. Further, in the battery 1-11, the proportion of short circuit batteries was extremely small. The reason for this is probably that by using the modified rubber mixture, the flexibility of the porous heat-resistant layer somewhat increased.

In the battery 1-12 in which the amount of the binder per 100 parts by weight of the insulating filler is 0.8 parts by weight, the proportion of short circuit batteries was somewhat large, and overheating was observed in the abnormal temperature rising test. Therefore, when the amount of the binder is small, sufficient heat resistance cannot be obtained in some cases. The batteries showing abnormal overheating in the abnormal temperature rising test (batteries 1-2, 1-12, etc.) were disassembled and observed. Then, it was confirmed that the porous heat-resistant layer peeled from the negative electrode mixture layer over a wider range, and short circuit occurred at this part.

On the other hand, in the battery 1-15 containing 7 parts by weight of the binder, heat-resistance was sufficient, but the high-rate discharge characteristics somewhat lowered. The reason for this is probably that the amount of the binder contained in the porous heat-resistant layer was large, so that the reaction resistance increased. Therefore, it is desirable that the amount of the binder is 1 to 5 parts by weight per 100 parts by weight of the insulating filler.

In the batteries 1-16 to 1-19, since the porous heat-resistant layer is provided at the outermost part of the electrode group, improvement in the capacity maintenance rate was not observed so much even if the length of the porous heat-resistant layer was changed. However, the proportion of short circuit batteries decreased irrespective of the length of the porous heat-resistant layer. Further, the high-rate discharge characteristics were maintained high.

Example 2

(Battery 2-1)

(Manufacturing of Positive Electrode)

100 parts by weight of lithium cobaltate, 4 parts by weight of PVDF, 3 parts by weight of AB and a suitable amount of NMP were mixed by a double arm kneader, to prepare a positive electrode paste. The resultant positive electrode paste was applied on a positive electrode current collector (thickness: 15 µm) made of an aluminum foil having a thickness of 15 µm, dried and rolled, to obtain a positive electrode plate having a current collector and mixture layers carried on both surfaces thereof. In this operation, the positive electrode paste was applied on the positive electrode current collector so that an exposed part of the current collector having a width of 5 mm was formed continuously on both surfaces of the current collector along one longer side of the positive electrode plate. Rolling was conducted so that the total thickness of the positive electrode plate was 80 µm.

Next, the positive electrode plate was cut into a width of 53 mm and a total length of 960 mm, to obtain a positive electrode. In the resultant positive electrode, the width of the exposed part of the current collector was 5 mm and the length along the width direction of the positive electrode mixture layer was 48 mm.

(Manufacturing of Negative Electrode)

100 parts by weight of artificial graphite, 1 part by weight of SBR, 1 part by weight of CMC and suitable amount of water were mixed by a double arm kneader, to prepare a negative electrode paste. The resultant negative electrode paste was applied on a negative electrode current collector (thickness: 10 µm) made of a copper foil, dried and rolled, to obtain a negative electrode plate having a current collector and mixture layers carried on both surfaces thereof. In this procedure, the negative electrode paste was applied on the negative electrode current collector so that an exposed part having a width of 5 mm was formed continuously on both surfaces of the current collector along one longer side of the negative electrode plate. Rolling was conducted so that the total thickness of the negative electrode plate was 100 µm.

Next, the resultant negative electrode plate was cut into a width of 55 mm and a total length of 1020 mm, to obtain a negative electrode. Here, the width of the exposed part of the current collector was 5 mm and the length along the width direction of the negative electrode mixture layer was 50 mm, in the resultant negative electrode.

(Formation of Porous Heat-resistant Layer)

A porous heat-resistant layer was continuously formed as shown in FIGS. 3a and 3b along two longer sides of each negative electrode mixture layer so as to face the boundary between a positive electrode mixture layer and an exposed part of a positive electrode current collector and another longer side of a positive electrode mixture layer with a separator interposed therebetween, when an electrode group was constituted. The porous heat-resistant layer was formed as described below.

3 parts by weight of PVDF was added per 100 parts by weight of alumina particles having an average particle size of 0.5 µm, and a suitable amount of NMP was added, to obtain a mixture. The mixture was stirred by a double arm kneader, and the alumina particles and PVDF were bead-mill-dispersed using zirconia beads having a diameter of 0.2 mm, to obtain a paste. The resultant paste was applied at a width of 5 mm along respective two longer sides of each negative electrode mixture layer, and dried to obtain a porous heat-resistant layer. Here, the thickness of the porous heat-resistant layer was 5 µm.

The positive electrode and negative electrode obtained as described above were wound with a separator (thickness: 23 µm) made of a PP microporous film interposed therebetween, to obtain an electrode group. In this procedure, the positive electrode and negative electrode were wound so that an exposed part of the positive electrode current collector was placed on the upper end face of the electrode group and an exposed part of the negative electrode current collector was placed on the lower end face of the electrode group as shown in FIG. 4.

Next, a positive electrode current collecting terminal was resistance-welded to an exposed part of the positive electrode current collector and a negative electrode current collecting terminal was resistance-welded to an exposed part of the negative electrode current collector, respectively. In this procedure, a powder of copper oxide was adhered on an electrode for resistance-welding, and conditions for easy generation of spark in welding were made.

Using the electrode group on which such current collecting terminals had been welded, a lithium ion secondary battery was manufactured in the same manner as for manufacturing of the above-mentioned battery 1-1. The resultant battery was called battery 2-1. The nominal capacity of the resultant battery was 1.3 Ah.

(Batteries 2-2 to 2-5)

Lithium ion secondary batteries were manufactured in the same manner as for the battery 2-1 except that the thickness of the porous heat-resistant layer was 0.8 µm, 1 µm, 10 µm or 12 µm. The resultant batteries were called batteries 2-2 to 2-5, respectively.

(Batteries 2-6 to 2-10)

Lithium ion secondary batteries were manufactured in the same manner as for the battery 2-1 except that fillers composed of magnesia, titania, zirconia, silica or aramid having the same diameter as the alumina particles were used instead of the alumina particles in manufacturing the porous heat-resistant layer. The resultant batteries were called 2-6 to 2-10, respectively.

(Battery 2-11)

A lithium ion secondary battery was manufactured in the same manner as for the battery 2-1 except that a modified rubber mixture containing an acrylonitrile unit (mixture of BM-500B and BM-720H manufactured by Nippon Xeon Co. Ltd. (mixing ratio (weight ratio), 1:1) of the same weight as PVDF was used instead of PVDF in manufacturing the porous heat-resistant layer. The resultant battery was called battery 2-11.

(Batteries 2-12 to 2-15)

Lithium ion secondary batteries were manufactured in the same manner as for the battery 2-1 except that the amount of PVDF per 100 parts by weight of the alumina particles was 0.8 parts by weight, 1 part by weigh, 5 parts by weight or 7 parts by weight in manufacturing the porous heat-resistant layer. The resultant batteries were called batteries 2-12 to 2-15, respectively.

Examples 2-16 to 2-20

Lithium ion secondary batteries were manufactured in the same manner as for the battery 2-1 except that the width of the porous heat-resistant layer was 0.5 mm, 1 mm, 10 mm, 15 mm or 20 mm. The resultant batteries were called batteries 2-16 to 2-20, respectively.

(Reference Battery 2-1)

A lithium ion secondary battery was manufactured in the same manner as for the battery 2-1 except that the porous heat-resistant layer was formed on the whole surface of the negative electrode mixture layer. The resultant battery was called reference battery 2-1.

(Comparative Battery 2-1)

A lithium secondary battery was manufactured in the same manner as for the battery 2-1 except that the porous heat-resistant layer was not formed. The resultant battery was called comparative battery 2-1.

(Comparative Battery 2-2)

A lithium ion secondary battery was manufactured in the same manner as for the battery 2-1 except that the porous heat-resistant layer was formed only at the exposed part of the positive electrode current collector. The resultant battery was called comparative battery 2-2.

(Comparative Battery 2-3)

A lithium ion secondary battery was manufactured in the same manner as for the battery 2-1 except that the porous heat-resistant layer was formed at an exposed part of the negative electrode current collector. The resultant battery was called comparative battery 2-3.

(Comparative Battery 2-4)

A lithium ion secondary battery was manufactured in the same manner as for the battery 2-1 except that a polyimide resin tape (width: 5 mm, thickness: 25 μm) was used instead of the porous heat-resistant layer and this PP resin tape was provided along the boundary between the positive electrode mixture layer and the exposed part of the positive electrode current collector. The resultant battery was called comparative battery 2-4.

Each of the resultant batteries was evaluated as described below.

(Short Circuit Examination)

20 of each battery were charged at a current value of 260 mA until the battery voltage reached 4.1V, and then, preserved for 7 days under an environment of 45° C. Batteries of which open circuit voltage decreased by 300 mV or more during preservation were called a short circuit battery. The proportions of short circuit batteries are designated as percentage in Tables 6 to 10.

(Capacity Confirmation)

One of the batteries, of each kind, showing no abnormality in the above-mentioned short circuit examination was discharged at a current value of 260 mA until the battery voltage decreased to 3.0 V.

Next, the battery after discharging was charged at a constant current value of 1.3 A until the battery voltage reached 4.2 V, and then, charged at a constant voltage value of 4.2 V until the charging current decreased to 50 mA. Next, the battery after charging was discharged at a constant current value of 260 mA until the battery voltage decreased to 3.0 V. Such a charging and discharging cycle was repeated twice. The discharge capacities at the second cycle (discharge capacity) are shown in Tables 6 to 10.

(High-rate Characteristic Evaluation)

The batteries after the above-mentioned capacity confirmation were charged and discharged as described below.

Each battery was charged at a constant current value of 1.3 A until the battery voltage reached 4.2 V, and then, charged at a constant voltage value of 4.2 V until the charging current decreased to 50 mA. Next, the battery after charging was discharged at a constant current value of 5.2 A until the battery voltage decreased to 3.0 V, and the high-rate discharge capacity was measured. The proportion of the high-rate discharge capacity to the discharge capacity measured in the above-mentioned capacity confirmation is designated by percentage (high-rate discharge capacity rate) in Tables 6 to 10.

In Tables 7 to 9, data of the battery 2-1 are also shown. Table 9 shows the ratio A/B1 simultaneously.

TABLE 6

|  | Thickness of porous heat-resistant layer (μm) | proportion of short circuit batteries (%) | discharge capacity (mAh) | high-rate discharge capacity ratio (%) |
|---|---|---|---|---|
| battery 2-1 | 5 | 5 | 1293 | 86 |
| battery 2-2 | 0.8 | 40 | 1290 | 90 |
| battery 2-3 | 1 | 5 | 1288 | 88 |
| battery 2-4 | 10 | 5 | 1289 | 86 |
| battery 2-5 | 12 | 0 | 1290 | 80 |

TABLE 7

|  | kind of filler | proportion of short circuit batteries (%) | discharge capacity (mAh) | high-rate discharge capacity ratio (%) |
|---|---|---|---|---|
| battery 2-1 | alumina | 5 | 1293 | 86 |
| battery 2-6 | magnesia | 0 | 1292 | 91 |
| battery 2-7 | titania | 5 | 1282 | 85 |
| battery 2-8 | zirconia | 5 | 1288 | 88 |
| battery 2-9 | silica | 5 | 1289 | 86 |
| battery 2-10 | aramid | 5 | 1290 | 86 |

TABLE 8

| | kind of binder | Amount of binder (parts by weight) | proportion of short circuit batteries (%) | discharge capacity (mAh) | high-rate discharge capacity ratio (%) |
|---|---|---|---|---|---|
| battery 2-1 | PVDF | 3 | 5 | 1293 | 86 |
| battery 2-11 | modified rubber mixture | 3 | 0 | 1292 | 86 |
| battery 2-12 | PVDF | 0.8 | 30 | 1290 | 85 |
| battery 2-13 | PVDF | 1 | 5 | 1288 | 84 |
| battery 2-14 | PVDF | 5 | 5 | 1288 | 86 |
| battery 2-15 | PVDF | 7 | 0 | 1289 | 79 |

TABLE 9

| | width of porous heat-resistant layer (mm) | ratio A/B1 | proportion of short circuit batteries (%) | discharge capacity (mAh) | high-rate discharge capacity ratio (%) |
|---|---|---|---|---|---|
| battery 2-1 | 5 | 0.10 | 5 | 1293 | 86 |
| battery 2-16 | 0.5 | 0.01 | 15 | 1292 | 89 |
| battery 2-17 | 1 | 0.02 | 5 | 1296 | 87 |
| battery 2-18 | 10 | 0.20 | 0 | 1288 | 87 |
| battery 2-19 | 15 | 0.30 | 0 | 1290 | 84 |
| battery 2-20 | 20 | 0.40 | 0 | 1290 | 80 |

TABLE 10

| | proportion of short circuit batteries (%) | discharge capacity (mAh) | high-rate discharge capacity ratio (%) |
|---|---|---|---|
| reference battery 2-1 | 0 | 1290 | 77 |
| comparative battery 2-1 | 95 | 1297 | 90 |
| comparative battery 2-2 | 50 | 1296 | 89 |
| comparative battery 2-3 | 45 | 1297 | 90 |
| comparative battery 2-4 | 0 | 1052 | 58 |

Approximately all of the comparative batteries 2-1 on which a porous heat-resistant layer was not formed caused short circuit. The reason for this is probably that the separator was melted under the influence of spark intentionally generated in welding the current collecting terminal to the exposed part of the current collector. The comparative battery 2-2 having the porous heat-resistant layer provided on the exposed part of the positive electrode current collector and the comparative battery 2-3 having the porous heat-resistant layer provided on the exposed part of the negative electrode current collector showed slightly lowered proportion of short circuit as compared with the comparative battery 2-1, and manifested no remarkable effect of preventing short circuit. The reason for this is probably that in the comparative battery 2-2 and the comparative battery 2-3, the formation position of the porous heat-resistant layer was inappropriate, melting of the separator by spark reached an edge of the positive electrode mixture layer and an edge of the negative electrode mixture layer, and insulation of the positive electrode and negative electrode could not be kept.

On the other hand, in the batteries 2-1 to 2-20 having the porous heat-resistant layer provided on a position as shown in FIGS. 3a, 3b and 4, short circuit of the battery could be decreased. The reason for this is probably as follows. Even if melting of the separator by spark reached an edge of the positive electrode mixture layer and/or an edge of the negative electrode mixture layer, the porous heat-resistant layer remained on the negative electrode mixture layer, and insulation of the positive electrode and negative electrode could be kept, because the heat-resistance of alumina contained in the porous heat-resistant layer was high.

The battery capacity of the comparative battery 2-4 using a resin tape instead of the porous heat-resistant layer decreased significantly from the nominal capacity (1.3 Ah) as compared with other batteries. The reason for this is probably that the ion conduction of the part covered with the resin tape of the positive electrode mixture layer becomes impossible, and the battery capacity decreases by a quantity corresponding to its area.

The battery 2-16 in which the width of the porous heat-resistant layer is 0.5 mm was superior to the comparative batteries 2-1 to 2-3, but the proportion of short circuit batteries was somewhat higher. The reason for this is probably that the width of the porous heat-resistant layer was too narrow, and hence, its role (securing insulation by improvement in heat-resistance) could not be exerted sufficiently. On the other hand, the battery 2-19 in which the width of the porous heat-resistant layer is 20 mm was superior to the reference battery 2-1, but the high-rate discharge characteristics somewhat decreased. The reason for this is probably that the width of the porous heat-resistant layer was too wide, and hence, the reaction resistance component increased by an extent corresponding to the width. Therefore, the ratio A/B1 is preferably 0.02 to 0.3.

In the batteries 2-6 to 2-9 using magnesia, titania, zirconia or silica as the insulating filler instead of alumina, there was slight difference in the capacity, but the proportion of short circuit batteries lowered, and the heat-resistance was sufficient. Also in the battery 2-10 using aramid as the insulating filler, the proportion of short circuit batteries was low.

In the battery 2-2 in which the thickness of the porous heat-resistant layer was 0.8 μm, the proportion of short circuit batteries was relatively high, and overheating was observed in the abnormal temperature rising test. The reason for this is probably that the thickness of the porous heat-resistant layer was small, and further, a lot of fine pin holes were observed on the porous heat-resistant layer, so that, in the battery 2-2, there were a lot of short circuit sites and generation of internal short circuit could not be sufficiently suppressed. As a result, when the thickness of the porous heat-resistant layer is small, sufficient heat-resistance cannot be obtained in some cases.

On the other hand, in the battery 2-5 having the porous heat-resistant layer with a thickness of 12 μm, the high-rate discharge characteristics decreased slightly. The reason for this is probably that the thickness of the formed porous heat-resistant layer was large and the reaction resistance increased. Therefore, it is desirable that the thickness of the porous heat-resistant layer is 1 to 10 μm.

In the battery 2-11 using a modified rubber mixture as the binder instead of PVDF, the heat-resistance was sufficient. Further, deterioration of battery characteristics due to swelling of the above-mentioned modified rubber was not observed. Further, in the battery 2-11, the proportion of short circuit batteries was extremely small. The reason for this is probably that by using the modified rubber mixture, the flexibility of the porous heat-resistant layer somewhat increased.

In the battery 2-12 in which the amount of the binder per 100 parts by weight of the insulating filler is 0.8 parts by weight, the proportion of short circuit batteries was somewhat large, and sufficient heat-resistance was not obtained. The batteries showing short circuit were disassembled and observed. Then, it was confirmed that the porous heat-resistant layer peeled from the negative electrode mixture layer over a wider range, and short circuit occurred at this part.

On the other hand, in the battery 2-15 containing 7 parts by weight of the binder, heat-resistance was sufficient, but the high-rate discharge characteristics somewhat lowered. The reason for this is probably that the amount of the binder contained in the porous heat-resistant layer was large, and hence, the reaction resistance increased. Therefore, it is desirable that the amount of the binder is 1 to 5 parts by weight per 100 parts by weight of the insulating filler.

Example 3

(Battery 3-1)

(Manufacturing of Positive Electrode)

100 parts by weight of lithium cobaltate, 4 parts by weight of PVDF, 3 parts by weight of AB and a suitable amount of NMP were mixed by a double arm kneader, to prepare a positive electrode paste. The resultant positive electrode paste was applied on a positive electrode current collector (thickness: 15 μm) made of an aluminum foil, dried and rolled, to obtain a positive electrode plate having a current collector and mixture layers carried on both surfaces thereof. In this operation, rolling was conducted so that the total thickness of the positive electrode plate was 160 μm.

Next, the resultant positive electrode plate was cut into a width of 53 mm and a total length of 630 mm, to obtain a positive electrode. Here, the length of the mixture layer formed on both surfaces of the current collector was controlled to 600 mm on each of two surfaces.

(Manufacturing of Negative Electrode)

100 parts by weight of artificial graphite, 1 part by weight of a styrene-butadiene copolymer binder (BM-400B manufactured by Nippon Xeon Co. Ltd. (40 wt. % of solid content)) as solid content, 1 part by weight of CMC and suitable amount of water were mixed by a double arm kneader, to prepare a negative electrode paste. The resultant negative electrode paste was applied on a negative electrode current collector (thickness: 10 μm) made of a copper foil, dried and rolled, to obtain a negative electrode plate having a current collector and mixture layers carried on both surfaces thereof. Here, rolling was conducted so that the total thickness of the negative electrode plate was 180 μm.

Next, the resultant negative electrode plate was cut into a width of 55 mm and a total length of 650 mm, to obtain a negative electrode. Here, the length of the mixture layer formed on both surfaces of the current collector was controlled to 620 mm on each of two surfaces.

(Formation of Porous Heat-resistant Layer)

In this example, a porous heat-resistant layer was formed only on both mixture layers of a negative electrode. Formation of a porous heat-resistant layer was conducted as described below.

3 parts by weight of PVDF was added to 100 parts by weight of alumina particles having an average particle size of 0.5 μm, and NMP was further added thereto. These materials were mixed Using a disperser such that the solid content was 50 wt %, to prepare a mixture. Thereafter, the alumina particles and PVDF contained in the mixture were dispersed by a media-less disperser, to obtain a paste.

The resultant paste was applied at a length of 124 mm on both the negative electrode mixture layers from an edge of its winding initiation side, and dried to obtain porous heat-resistant layers. Here, the width of the porous heat-resistant layer and the width of the negative electrode mixture layer were the same. The thickness of the porous heat-resistant layer was 5 μm.

The positive electrode and negative electrode obtained as described above were wound with a separator made of a PP microporous film (thickness: 23 μm) interposed therebetween so that the porous heat-resistant layer was situated at the core part of the electrode group, to obtain an electrode group. In this procedure, winding was effected while dispersing a Ni powder having a diameter of 8 μm as a conductive extraneous material at a position 5 mm away from an edge of the negative electrode winding initiation side.

Using thus obtained electrode group, a lithium ion secondary battery was manufactured in the same manner as for the battery 1-1. The resultant battery was called battery 3-1. Here, the nominal capacity of the resultant battery was 2 Ah.

(Batteries 3-2 to 3-5)

Lithium ion secondary batteries were manufactured in the same manner as for the battery 3-1 except that the thickness of the porous heat-resistant layer was 0.8 μm, 1 μm, 10 μm or 12 μm. The resultant batteries were called batteries 3-2 to 3-5, respectively.

(Batteries 3-6 to 3-10)

Lithium ion secondary batteries were manufactured in the same manner as for the battery 3-1 except that fillers made of magnesia, titania, zirconia, silica or aramid having the same diameter as the alumina particles were used instead of the alumina particles in manufacturing the porous heat-resistant layer. The resultant batteries were called batteries 3-6 to 3-10.

(Battery 3-11)

A lithium ion secondary battery was manufactured in the same manner as for the battery 3-1 except that a modified rubber mixture containing an acrylonitrile unit (mixture of BM-500B and BM-720H manufactured by Nippon Xeon Co. Ltd. (mixing ratio (weight ratio), 1:1) of the same weight as PVDF was used instead of PVDF in manufacturing the porous heat-resistant layer. The resultant battery was called battery 3-11.

(Batteries 3-12 to 3-15)

Lithium ion secondary batteries were manufactured in the same manner as for the battery 3-1 except that the amount of PVDF per 100 parts by weight of the alumina particles was 0.8 parts by weight, 1 part by weigh, 5 parts by weight or 7 parts by weight in manufacturing the porous heat-resistant layer. The resultant batteries were called batteries 3-12 to 3-15, respectively.

Examples 3-16 to 3-20

Lithium ion secondary batteries were manufactured in the same manner as for the battery 3-1 except that the length of the porous heat-resistant layer from an edge at the winding initiation side of the negative electrode mixture layer was 10 mm, 12.4 mm, 49.6 mm, 186 mm or 248 mm. The resultant batteries were called batteries 3-16 to 3-20, respectively.

(Reference Battery 3-1)
A lithium ion secondary battery was manufactured in the same manner as for the battery 3-1 except that the porous heat-resistant layer was formed on the whole surface of the negative electrode mixture layer. The resultant battery was called reference battery 3-1.

(Comparative Battery 3-1)
A lithium ion secondary battery was manufactured in the same manner as for the battery 3-1 except that the porous heat-resistant layer was not formed. The resultant battery was called comparative battery 3-1.

Each of the resultant batteries was evaluated as described below.

(Short Circuit Examination)
20 of each battery were charged at a current value of 260 mA until the battery voltage reached 4.1V, and then, preserved for 7 days under an environment of 45° C. Batteries of which an open circuit voltage decreased by 300 mV or more during preservation were called a short circuit battery. The proportions of short circuit batteries are designated as percentage in Tables 11 to 15.

(Capacity Confirmation)
One of the batteries, of each kind, showing no abnormality in the above-mentioned short circuit examination were individually discharged at a current value of 400 mA until the battery voltage decreased to 3.0 V.
Next, the battery after discharging was charged at a constant current value of 2 A until the battery voltage reached 4.2 V, and then, charged at a constant voltage value of 4.2 V until the charging current decreased to 50 mA. Next, the battery after charging was discharged at a constant current value of 400 mA until the battery voltage decreased to 3.0 V. Such a charging and discharging cycle was repeated twice. The discharge capacities at the second cycle (discharge capacity) are shown in Tables 11 to 15.

(High-rate Characteristic Evaluation)
The batteries after the above-mentioned capacity confirmation were charged and discharged as described below.
Each battery was charged at a constant current value of 2 A until the battery voltage reached 4.2 V, and then, charged at a constant voltage value of 4.2 V until the charging current decreased to 50 mA. Next, the battery after charging was discharged at a constant current value of 4 A until the battery voltage decreased to 3.0 V, and the high-rate discharge capacity was measured. The proportion of the high-rate discharge capacity to the discharge capacity measured in the above-mentioned capacity confirmation is designated by percentage (high-rate discharge capacity ratio) in Tables 11 to 15.

(Cycle Life Characteristics)
Each battery was charged at a constant current value of 2 A until the battery voltage reached 4.2 V under an environment of 45° C., and then, charged at a constant voltage value of 4.2 V until the charging current value decreased to 50 mA. Next, the battery after charging was discharged at a constant current value of 2 A until the battery voltage decreased to 3.0 V. Such a charge and discharge cycle was repeated 500 times. The proportion of the discharge capacity at 500th cycle to the discharge capacity in the above-mentioned capacity confirmation is designated as percentage (capacity maintenance rate) in Tables 11 to 15.

In Tables 12 to 14, results of the battery 3-1 are also shown simultaneously. Table 14 shows the ratio A/B1 simultaneously.

TABLE 11

| | thickness of porous heat-resistant layer (μm) | proportion of short circuit batteries (%) | discharge capacity (mAh) | high-rate discharge capacity ratio (%) | capacity maintenance rate (%) |
|---|---|---|---|---|---|
| battery 3-1 | 5 | 5 | 1992 | 86 | 91 |
| battery 3-2 | 0.8 | 15 | 1990 | 90 | 82 |
| battery 3-3 | 1 | 5 | 1988 | 88 | 86 |
| battery 3-4 | 10 | 5 | 1986 | 89 | 90 |
| battery 3-5 | 12 | 0 | 1990 | 75 | 90 |

TABLE 12

| | kind of filler | proportion of short circuit batteries (%) | discharge capacity (mAh) | high-rate discharge capacity ratio (%) | capacity maintenance rate (%) |
|---|---|---|---|---|---|
| battery 3-1 | alumina | 5 | 1992 | 86 | 91 |
| battery 3-6 | magnesia | 0 | 1992 | 88 | 90 |
| battery 3-7 | titania | 5 | 1983 | 86 | 86 |
| battery 3-8 | zirconia | 5 | 1988 | 90 | 88 |
| battery 3-9 | silica | 5 | 1986 | 87 | 88 |
| battery 3-10 | aramid | 5 | 1990 | 87 | 86 |

TABLE 13

| | kind of binder | amount of binder (parts by weight) | proportion of short circuit batteries (%) | discharge capacity (mAh) | high-rate discharge capacity ratio (%) | capacity maintenance rate (%) |
|---|---|---|---|---|---|---|
| battery 3-1 | PVDF | 3 | 5 | 1992 | 86 | 91 |
| battery 3-11 | modified rubber mixture | 3 | 0 | 1994 | 89 | 91 |
| battery 3-12 | PVDF | 0.8 | 20 | 1986 | 90 | 92 |
| battery 3-13 | PVDF | 1 | 5 | 1988 | 88 | 90 |
| battery 3-14 | PVDF | 5 | 5 | 1990 | 87 | 90 |
| battery 3-15 | PVDF | 7 | 0 | 1986 | 85 | 86 |

TABLE 14

| | length of porous heat-resistant layer (mm) | ratio A/B1 | proportion of short circuit batteries (%) | discharge capacity (mAh) | high-rate discharge capacity ratio (%) | capacity maintenance rate (%) |
|---|---|---|---|---|---|---|
| battery 3-1 | 124 | 0.20 | 5 | 1992 | 86 | 91 |
| battery 3-16 | 10 | 0.016 | 5 | 1988 | 90 | 83 |
| battery 3-17 | 12.4 | 0.02 | 5 | 1986 | 88 | 85 |
| battery 3-18 | 49.6 | 0.08 | 5 | 1992 | 89 | 87 |
| battery 3-19 | 186 | 0.30 | 0 | 1986 | 90 | 89 |
| battery 3-20 | 248 | 0.40 | 0 | 1990 | 83 | 90 |

TABLE 15

| | proportion of short circuit batteries (%) | discharge capacity (mAh) | high-rate discharge capacity ratio (%) | capacity maintenance rate (%) |
|---|---|---|---|---|
| Reference battery 3-1 | 5 | 1981 | 80 | 90 |
| Comparative battery 3-1 | 95 | 1995 | 90 | 80 |

There was not so large difference in the battery capacity between the reference battery 3-1 having the porous heat-resistant layer provided on the whole surface of the negative electrode mixture layer and the comparative battery 3-1 having no porous heat-resistant layer. In the reference battery 3-1, the high-rate discharge characteristics decreased as compared with the comparative battery 3-1. The reason for this is probably that the porous heat-resistant layer gives resistance against diffusion of lithium ions.

The capacity maintenance rate, namely, the cycle life characteristics were improved in the reference battery 3-1 as compared with the comparative battery 3-1. The batteries after the cycles were disassembled and distribution of an electrolyte on the electrode plate was checked. As a result, in the comparative battery 3-1 having no porous heat-resistant layer provided, an electrolyte was scarcely retained on the inner peripheral side of the electrode group. On the other hand, in the reference battery 3-1 having the porous heat-resistant layer provided on the whole surface of the mixture layer, it was found that an electrolyte was kept relatively also on the inner peripheral side of the electrode group though its amount was small as compared with the outer peripheral side of the electrode group.

While the comparative battery 3-1 had low short circuit-resistance, the reference battery 3-1 and batteries 3-1 to 3-20 had improved short circuit-resistance. As described above, the thickness of a separator decreases due to various stresses around the core part of the electrode group, and therefore, when a conductive extraneous material is disposed in the core part, its influence is easily exerted. However, in the reference battery 3-1 and batteries 3-1 to 3-20, an influence of the conductive extraneous material can be avoided since the porous heat-resistant layer is present in the core part of the electrode group.

The batteries 3-1 to 3-20 had high-rate discharge characteristics improved than the reference battery 3-1. The reason for this is probably that the batteries 3-1 to 3-20 had smaller area of the porous heat-resistant layer, and diffusion resistance of lithium ions is reduced, as compared with the reference battery 3-1 having the porous heat-resistant layer provided on the whole surface. The cycle characteristics are also excellent when the area of the porous heat-resistant layer is smaller, like the high-rate characteristics. Additionally, when the ratio A/B1 is 0.02 to 0.3, the least capacity maintenance rate value was 85%, more excellent result than the reference battery having the porous heat-resistant layer provided on the whole surface of the mixture layer. The reason for this is probably that an electrolyte is kept with good balance between the outer peripheral side at which the separator works sufficiently as an electrolyte retaining material and the core part side at which the porous heat-resistant layer works as an electrolyte retaining material. That is, both when the area of the porous heat-resistant layer provided near the core part is deficient and when it is surplus, the above-mentioned balance of the retention amount of the electrolyte is broken though slightly. However, by controlling the ratio A/B1 at from 0.02 to 0.3, decrease in battery characteristics can be prevented.

In the batteries 3-6 to 3-9 using magnesia, titania, zirconia or silica instead of alumina, the proportion of short circuit batteries was low and heat-resistance was sufficient though slightly differing in capacity. Also in the battery 3-10 using aramid as the insulating filler, the proportion of short circuit batteries was low.

In the battery 3-2 in which the thickness of the porous heat-resistant layer was 0.8 µm, the proportion of short circuit batteries was as relatively high as 15%, and sufficient heat-resistance was not obtained. The capacity maintenance rate of the battery 3-2 was not so different from the capacity maintenance rate of the comparative battery 3-1. The reason for this is probably that when the thickness of the porous heat-resistant layer is small, it is difficult to suppress internal short circuit and to improve liquid keeping effect.

On the other hand, in the battery 3-5 having the porous heat-resistant layer with the thickness of 12 µm, the high-rate discharge characteristics decreased slightly though the capacity maintenance rate was as high as 90%. The reason for this is probably that the thickness of the porous heat-resistant layer was large and the reaction resistance increased. Therefore, it is desirable that the thickness of the porous heat-resistant layer is 1 to 10 µm.

In the battery 3-11 using a modified rubber mixture as the binder instead of PVDF, the heat-resistance was sufficient. Further, deterioration of battery characteristics due to swelling of the above-mentioned modified rubber was not observed. Further, short circuit of the battery was extremely small. The reason for this is probably that by using the modified rubber mixture, the flexibility of the porous heat-resistant layer somewhat increased.

In the battery 3-12 in which the amount of the binder per 100 parts by weight of the insulating filler is 0.8 parts by weight, the proportion of short circuit batteries was somewhat large. Therefore, when the amount of the binder is small, sufficient heat resistance cannot be obtained in some cases. The batteries showing short circuit were disassembled and observed. Then, it was confirmed that the porous heat-resistant layer peeled from the negative electrode mixture layer over a wider range, and short circuit occurred at this part.

On the other hand, in the battery 3-15 containing 7 parts by weight of the binder, heat-resistance was sufficient, but the high-rate discharge characteristics somewhat lowered. The reason for this is probably that the amount of the binder contained in the porous heat-resistant layer was large, and hence, the reaction resistance increased. Therefore, it is desirable that the amount of the binder is 1 to 5 parts by weight per 100 parts by weight of the insulating filler.

As described above, the lithium ion secondary battery of the present invention is capable of maintaining battery characteristics while improving short circuit-resistance, and therefore, it can be used as a power source of electronic appliances for which high reliability is required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising:
    an electrode group comprising a belt-shaped positive electrode and a belt-shaped negative electrode that are wound with a separator interposed therebetween; and
    a can with a bottom for accommodating said electrode group,
    wherein said positive electrode includes a positive electrode current collector and a positive electrode mixture layer carried on said positive electrode current collector,
    said negative electrode includes a negative electrode current collector and a negative electrode mixture layer carried on said negative electrode current collector,
    a porous heat-resistant layer is partially provided between said separator and at least one of said positive electrode mixture layer and said negative electrode mixture layer,
    said porous heat-resistant layer is positioned along at least one side of at least one of said positive electrode mixture layer and said negative electrode mixture layer, and is provided from an edge of winding initiation side to a given position on at least one of said positive electrode mixture layer and said negative electrode mixture layer, and
    when the area of said porous heat-resistant layer is represented by A and the area of said mixture layer is represented by B, the ratio A/B of the area A to the area B is 0.02 to 0.3.

2. A lithium ion secondary battery comprising:
    an electrode group comprising a belt-shaped positive electrode and a belt-shaped negative electrode that are wound with a separator interposed therebetween; and
    a can with a bottom for accommodating said electrode group,
    wherein said positive electrode includes a positive electrode current collector and a positive electrode mixture layer carried on said positive electrode current collector,
    said negative electrode includes a negative electrode current collector and a negative electrode mixture layer carried on said negative electrode current collector, and
    a porous heat-resistant layer is provided on said negative electrode mixture layer and is partially provided between said separator and at least one of said positive electrode mixture layer and said negative electrode mixture layer, and
    when the area of said porous heat-resistant layer is represented by A and the area of said negative electrode mixture layer is represented by B1, the ratio A/B1 of the area A to the area B1 is 0.02 to 0.3.

3. The lithium ion secondary battery in accordance with claim 2,
    wherein the width of said negative electrode mixture layer is larger than the width of said positive electrode mixture layer.

4. The lithium ion secondary battery in accordance with claim 2,
    wherein an exposed part of said positive electrode current collector on which said positive electrode mixture layer is not carried is provided along at least one shorter side of said belt-shaped positive electrode, and
    said porous heat-resistant layer is provided so as to face said boundary between said positive electrode mixture layer and said exposed part of the positive electrode current collector with said separator interposed therebetween.

5. The lithium ion secondary battery in accordance with claim 2,
    wherein an exposed part of said positive electrode current collector on which said positive electrode mixture layer is not carried is provided along at least one longer side of said belt-shaped positive electrode, and
    said porous heat-resistant layer is provided so as to face at least one boundary between said positive electrode mixture layer and said exposed part of the positive electrode current collector with said separator interposed therebetween.

6. The lithium ion secondary battery in accordance with claim 2,
    wherein an exposed part of said negative electrode current collector on which said negative electrode mixture layer is not carried is provided along at least one longer side of said belt-shaped negative electrode, and
    said porous heat-resistant layer is provided along at least one boundary between said negative electrode mixture layer and said exposed part of the negative electrode current collector.

7. The lithium ion secondary battery in accordance with claim 2,
    wherein said exposed part of the positive electrode current collector and said exposed part of the negative electrode current collector are respectively provided at two end faces of said electrode group, a positive electrode current collecting terminal is welded to said exposed part of the positive electrode current collector, and a negative electrode current collecting terminal is welded to said exposed part of the negative electrode current collector.

8. A comprising:
    an electrode group comprising a belt-shaped positive electrode and a belt-shaped negative electrode that are wound with a separator interposed therebetween; and
    a can with a bottom for accommodating said electrode group,
    wherein said positive electrode includes a positive electrode current collector and a positive electrode mixture layer carried on said positive electrode current collector,
    said negative electrode includes a negative electrode current collector and a negative electrode mixture layer carried on said negative electrode current collector, and
    a porous heat-resistant layer is partially provided between said separator and at least one of said positive electrode mixture layer and said negative electrode mixture layer, and
    the thickness of said porous heat-resistance layer is 1 to 10 µm.

9. The lithium ion secondary battery in accordance with claim 8,
    wherein said exposed part of the positive electrode current collector and said exposed part of the negative electrode current collector are respectively provided at two end faces of said electrode group, a positive electrode current collecting terminal is welded to said exposed part of the positive electrode current collector, and a negative electrode current collecting terminal is welded to said exposed part of the negative electrode current collector.

10. A lithium ion secondary battery comprising:

an electrode group comprising a belt-shaped positive electrode and a belt-shaped negative electrode that are wound with a separator interposed therebetween; and a can with a bottom for accommodating said electrode group, wherein said positive electrode includes a positive electrode current collector and a positive electrode mixture layer carried on said positive electrode current collector, and said negative electrode includes a negative electrode current collector and a negative electrode mixture layer carried on said negative electrode current collector, a porous heat-resistant layer is partially provided between said separator and at least one of said positive electrode mixture layer and said negative electrode mixture layer, and wherein said porous heat-resistance layer comprises an insulating filler and a binder, and said porous heat-resistant layer comprises said binder in an amount of 1 to 5 parts by weight per 100 parts by weight of said insulating filler.

11. The lithium ion secondary battery in accordance with claim 10, wherein said insulating filler comprises at least one selected from the group consisting of alumina, magnesia, titania, zirconia and silica.

12. The lithium ion secondary battery in accordance with claim 11, wherein said exposed part of the positive electrode current collector is provided along a shorter side of the positive electrode on the winding end side.

13. The lithium ion secondary battery in accordance with claim 10, wherein said binder comprises at least one of a modified rubber particle containing an acrylonitrile unit, and polyvinylidene fluoride.

14. The lithium ion secondary battery in accordance with claim 10, wherein said exposed part of the positive electrode current collector and said exposed part of the negative electrode current collector are respectively provided at two end faces of said electrode group, a positive electrode current collecting terminal is welded to said exposed part of the positive electrode current collector, and a negative electrode current collecting terminal is welded to said exposed part of the negative electrode current collector.

* * * * *